United States Patent
Lindner et al.

(10) Patent No.: US 9,674,121 B2
(45) Date of Patent: Jun. 6, 2017

(54) DYNAMIC INVITES WITH AUTOMATICALLY ADJUSTING DISPLAYS

(71) Applicant: QUALCOMM Incorporated, San Diego, CA (US)

(72) Inventors: Mark Aaron Lindner, Broomfield, CO (US); Kameron Noell Kerger, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/940,483

(22) Filed: Nov. 13, 2015

(65) Prior Publication Data

US 2016/0072740 A1 Mar. 10, 2016

Related U.S. Application Data

(63) Continuation of application No. 14/160,765, filed on Jan. 22, 2014, now Pat. No. 9,191,349.

(51) Int. Cl.
| | |
|---|---|
| *G06F 15/16* | (2006.01) |
| *H04L 12/58* | (2006.01) |
| *G06Q 10/10* | (2012.01) |

(52) U.S. Cl.
CPC ............ *H04L 51/04* (2013.01); *G06Q 10/10* (2013.01); *H04L 51/06* (2013.01)

(58) Field of Classification Search
CPC .......... H04L 51/04; H04L 51/06; G06Q 10/10
See application file for complete search history.

(56) References Cited

U.S. PATENT DOCUMENTS

| 7,023,980 B2 | 4/2006 | Lenard | |
|---|---|---|---|
| 2003/0204427 A1* | 10/2003 | Gune | G06Q 10/10 705/1.1 |

(Continued)

FOREIGN PATENT DOCUMENTS

| GB | 2488551 A | 9/2012 |
|---|---|---|
| WO | 2011020184 A1 | 2/2011 |
| WO | 2012114356 A2 | 8/2012 |

OTHER PUBLICATIONS

International Search Report and Written Opinion—PCT/US2015/012311—ISA/EPO—Apr. 20, 2015.

*Primary Examiner* — Jonathan Bui
(74) *Attorney, Agent, or Firm* — The Marbury Law Group, PLLC

(57) ABSTRACT

Methods, devices, systems, and non-transitory processor-readable storage media for providing a collaboration tool for soliciting responses from users, including operations for receiving at a computing device a request from a user, transmitting to a plurality of computing devices an invitation message that causes the plurality of computing devices to render a display that solicits a response to the request, receiving a response message related to the request from at least one of the plurality of computing devices, evaluating the received response message to determine whether the received response message fulfills the request, and transmitting to the plurality of computing devices a cancellation message in response to determining that the received response message fulfills the request, the cancellation message configured to cause the plurality of computing devices to perform operations to automatically clean-up the display that solicits the response to the request.

30 Claims, 18 Drawing Sheets

(56) References Cited

U.S. PATENT DOCUMENTS

| | | |
|---|---|---|
| 2008/0133580 A1 | 6/2008 | Wanless et al. |
| 2009/0147778 A1 | 6/2009 | Wanless et al. |
| 2011/0029622 A1 | 2/2011 | Walker et al. |
| 2011/0251924 A1* | 10/2011 | Savilia .................. G06Q 30/02 705/27.1 |
| 2012/0084168 A1 | 4/2012 | Adair et al. |
| 2012/0290950 A1* | 11/2012 | Rapaport ................ H04L 51/32 715/753 |
| 2013/0332826 A1* | 12/2013 | Karunamuni ........... G06F 17/27 715/273 |
| 2014/0051465 A1* | 2/2014 | Ruys ...................... G08G 1/202 455/457 |
| 2015/0170210 A1* | 6/2015 | Rhee ................. G06Q 30/0241 705/14.64 |
| 2015/0193819 A1* | 7/2015 | Chang ............... G06Q 10/1095 705/7.19 |
| 2015/0207766 A1 | 7/2015 | Lindner et al. |

* cited by examiner

A list of contacts may be rendered on user's mobile device

User may select contacts (i.e., recipients) she wants to respond to a request (e.g., answer a question, call via PTT application, etc.)

On the recipients' devices, the display of the request may be automatically removed once the request is fulfilled (or satisfied)

Alternatively, the display of the request may be automatically adjusted to indicate the request has been fulfilled Recipient devices may get a full display via an app Recipient devices may get a limited display via an app Recipient devices may get a representation via other functionality (e.g., SMS)

DYNAMIC INVITES WITH AUTOMATICALLY ADJUSTING DISPLAYS

RELATED APPLICATIONS

The present application claims the benefit of priority to U.S. Non-Provisional application Ser. No. 14/160,765, entitled "Dynamic Invites With Automatically Adjusting Displays" filed Jan. 22, 2014, the entire contents of which are hereby incorporated by reference.

BACKGROUND

Forced group communications (e.g., push-to-talk or 'PTT', email, MMS text, etc.) can be disruptive to recipients, especially if over-utilized for trivial topics. For example, using push-to-talk communications to ask a question of many users may be distracting and unnecessary when a single user may supply an adequate response. As another example, emailing many recipients may cause unwanted mail, tedious garbage clean-up by recipients, as well as result in redundant responses due to the asynchronous format of the medium. Existing techniques may use presence information for group communications; however presence information is difficult to keep current and performs poorly.

SUMMARY

The various embodiments provide methods, devices, systems, and non-transitory processor-readable storage media for providing a collaboration tool for soliciting responses from users. An embodiment method may include operations for receiving at a computing device a request from a user, transmitting from the computing device to a plurality of computing devices an invitation message that causes the plurality of computing devices to render a display that solicits a response to the request, receiving at the computing device a response message related to the request from at least one of the plurality of computing devices, evaluating by the computing device the received response message to determine whether the received response message fulfills the request, and transmitting from the computing device to the plurality of computing devices a cancellation message in response to determining that the received response message fulfills the request, the cancellation message configured to cause the plurality of computing devices to perform operations to automatically clean-up the display that solicits the response to the request.

In an embodiment, the method may further include automatically performing at the computing device clean-up operations on local data to indicate the request is fulfilled in response to determining that the received response message fulfills the request. In an embodiment, the request may be at least one of a question to be answered by recipients associated with the plurality of computing devices or a task to be completed by the recipients associated with the plurality of computing devices. In an embodiment, the display that solicits the response to the request may indicate a preferred response mode for the plurality of computing devices to transmit response messages related to the request. In an embodiment, the computing device executing the method may be one of a server or a mobile computing device.

In an embodiment, the method may further include generating by the computing device a follow-up request corresponding to unfulfilled portions of the request in response to determining that the received response message does not fulfill the request, and transmitting from the computing device to the plurality of computing devices an updated invitation message that solicits responses to the follow-up request in response to determining that the received response message does not fulfill the request. In an embodiment, transmitting an updated invitation message may include identifying by the computing device a first set of devices in the plurality of computing devices that transmitted the response message related to the request, transmitting from the computing device to the first set of devices the cancellation message configured to cause the first set of devices to perform the operations to automatically clean-up the display that solicits the response to the request, identifying by the computing device a second set of devices in the plurality of computing devices that have not transmitted response messages related to the request, and transmitting from the computing device to the second set of devices the updated invitation message.

In an embodiment, the method may further include obtaining information from data sources to validate the request, and determining whether the request is still valid based on the obtained information, which may include at least one of time-based information, location information, and information that will enable the computing device to determine or infer whether the request remains relevant. Data sources may include at least one of a time measurement unit, a source of location information (e.g., a Global Positioning System (GPS) unit or other unit, module or service that provides location information service), a local information database, and an Internet resource. In this embodiment, transmitting from the computing device to the plurality of computing devices a cancellation message in response to determining that the received response message fulfills the request may include transmitting from the computing device to the plurality of computing devices a cancellation message in response to determining that the received response message fulfills the request or in response to determining that the request is not still valid based on the obtained information.

Further embodiments include a computing device, which may be a server or a person computing device, such as a mobile device, configured with processor-executable instructions to perform operations of the methods described above.

Further embodiments include a computing device, which may be a server or a person computing device, such as a mobile device, having means for performing functions of the operations of the methods described above.

Further embodiments include non-transitory processor readable medium on which are store processor-executable instructions configured to cause a processor of a server or person computing device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
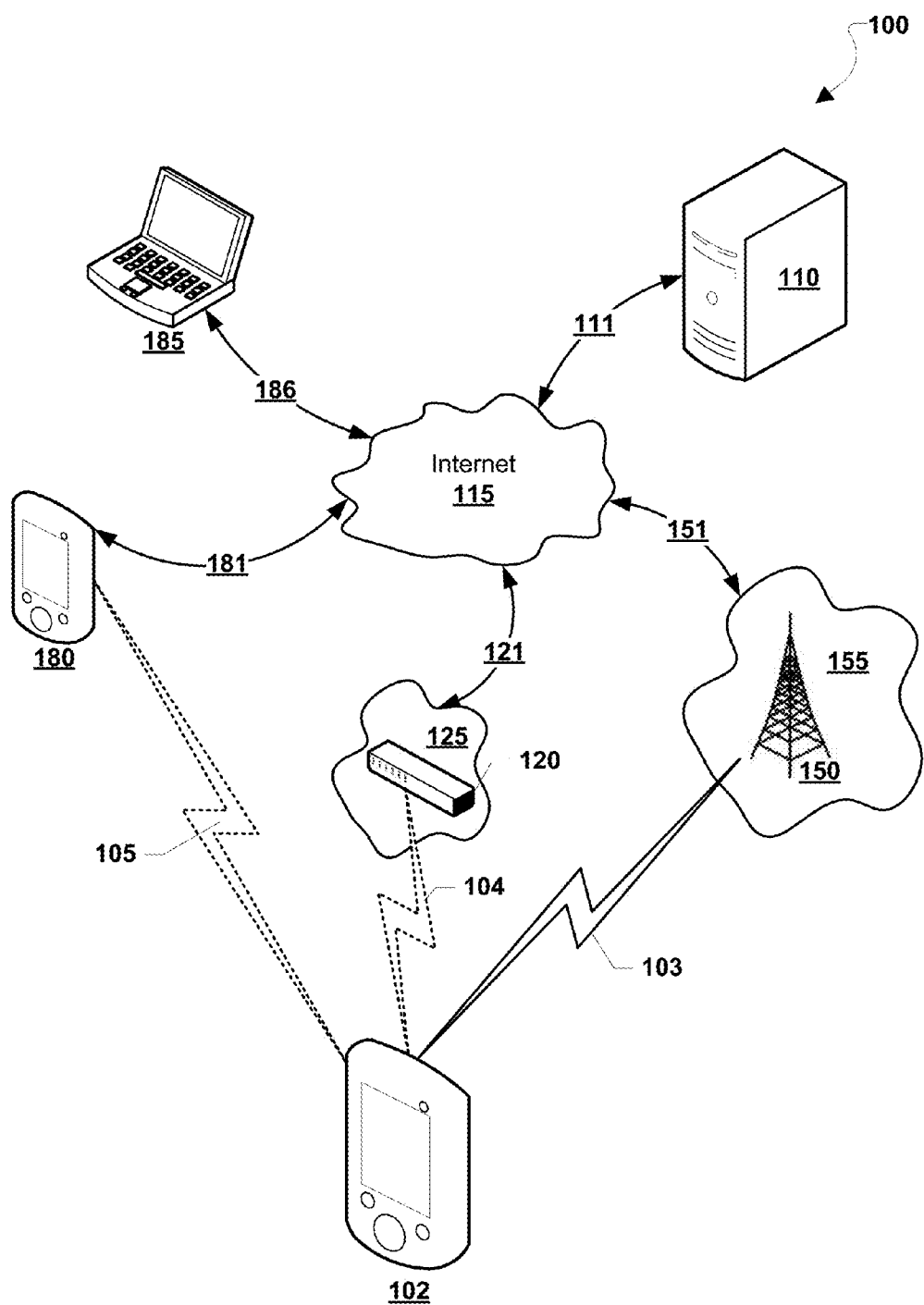
FIG. 1 is a component block diagram of a communication system suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" or "computing device" are used herein to refer to any one or all of cellular telephones, smart-phones (e.g., iPhone), web-pads, tablet computers, Internet enabled cellular telephones, WiFi enabled electronic devices, personal data assistants (PDA's), laptop computers, personal computers, and similar electronic communication devices equipped with at least a processor and a network transceiver. In various embodiments, such devices may be configured with a network transceiver to establish a wide area network (WAN) or local area network (LAN) connection (e.g., an LTE, 3G or 4G wireless wide area network transceiver, a wired connection to the Internet, or WiFi) in order to communication with other devices.

The term "server" is used to refer to any computing device capable of functioning as a server, such as a master exchange server, web server, mail server, document server, and a personal or mobile computing device configure with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

In the following descriptions the term "user computing device" may be used to refer to a computing device (e.g., a smartphone, a laptop, etc.) used by a user presenting a request to a group of recipients. The term "recipient computing device(s)" may be used to refer to a computing device(s) used by another user(s) or "recipient(s)" in order to exchange messages related to the user's request. Both the user computing device and recipient computing device(s) may be within a plurality of computing devices.

The various embodiments provide methods, devices, systems, and non-transitory processor-readable storage media to enable a user to solicit responses to persistent requests that are dynamically displayed at recipient computing devices to avoid unnecessary responses or other disruptions. An invitation message transmitted by a user computing device to recipient computing devices may indicate a user's request, such as a question or task to be responded to by the recipients. In response to receiving the invitation message, recipient computing devices may render displays that indicate the user's request, such as by rendering graphical elements within a PTT application indicating there is an outstanding question to be answered by the recipients.

The user computing device may process and evaluate response messages from the recipient computing devices to determine whether the request is fulfilled (or satisfied). For example, the user computing device may perform speech or text analysis routines, software, or other operations to identify pieces of information within received response messages that answer a question posed by an invitation message. When response messages include information that fulfill the request (e.g., a question is answered adequately by the text content of a response message, etc.), the user computing device may transmit additional messages (i.e., cancellation messages) to the recipient computing devices that cause the displays that indicate the user's request to be automatically cleaned-up. For example, when the user's request is determined to be completely fulfilled by received responses from others (e.g., a question is answered), the displays may be automatically deleted, hidden, or otherwise adjusted to indicate the request is satisfied and no longer active. As another example, when the user's request is determined to no longer be valid due to an expired freshness condition of the request, the displays may be adjusted to indicate the request has expired or is no longer valid (e.g., "expired," "invalid," "irrelevant," etc.). In an embodiment, the user computing device may be configured to also automatically perform clean-up operations, such as by deleting entries in local databases in response to determining a request has been completely fulfilled.

When the user computing device determines that a request is not completely fulfilled based on received response messages from recipient computing devices, the user computing device may transmit updated invitation messages with follow-up requests. For example, when response messages do not answer an initial question posed by the user, the user computing device may transmit updated invitation messages with new, redefined, or rephrased questions designed to solicit the information not provided by previously received responses. Such updated invitation messages may cause the displays on recipient computing devices to automatically update information related to the original requests. For example, a graphical element may include text, labels, colors, etc. that indicate an original request has been partially answered but is still not completely fulfilled. In an embodiment, messages may be transmitted that indicate a request has been partially answered.

As an illustration: a user may select a plurality of recipient computing devices to receive an invitation message that requests directions from a first city to a building within a corporate campus in a second city (e.g., "How do I get from Los Angeles to your lab on campus in San Diego?"). In response to receiving the invitation message, each of the plurality of recipient computing devices may render a display indicating an active request for the directions from the first city to the campus. The user computing device may receive a first response message and, after performing natural language processing operations on the text of the first response message, may determine that the response only provided directions from the first city to the campus within the second city (e.g., "Take Interstate 5 and then take exit XYZ to get to campus."), thus only partially fulfilling (or answering) the request. In response, the user computing device may transmit an updated invitation message that asks recipients to provide directions from the second city to the campus and also the building itself (e.g., "Please provide the directions from the main gate of the campus to your lab building."). In response to receiving the updated invitation message, each of the plurality of recipient computing devices may automatically update their displays to indicate the request is only soliciting directions from the main gate of the campus to the building. The user computing device may eventually receive a second response message that includes walking directions from the main gate of the campus to the building, and the user computing device may transmit cancellation messages to all of the recipient computing devices. In response, each of the recipient computing devices may automatically clean-up (e.g., remove) the display of the query.

In an embodiment, invitation messages may also include presence indications, such as information that describes the status of a request and/or the status/activity of the user related to the request. For example, the user computing device may transmit an invitation message that poses a question to a group of co-workers and that includes a flag indicating the question is still unanswered. Such presence indications may be communicated via various messages from the user computing device, such as updated invitation messages that are transmitted as conditions change and/or in response to receiving response messages. For example, when the user computing device receives a response message from a first recipient computing device that answers the message adequately, the user computing device may transmit a message causing the display of a second recipient computing device to change to report that the request is no longer active (e.g., "satisfied," etc.).

The user computing device may transmit invitation messages that indicate how recipient computing devices may best respond to the request (i.e., a preferred response mode). For example, the user computing device may transmit an invitation message that includes a code indicating that response messages may be sent via a PTT application or SMS/MMS text messages. As another example, when the user starts a phone call, enters a predetermined location based on global positioning system (GPS) coordinates or other location information, or is determined to be "on-call" based on locally stored schedule or calendar information, the user computing device may transmit a message causing the display on a recipient computing device to change to show that response messages may no longer be transmitted via a PTT application but instead must be sent via SMS/MMS text messages. In an embodiment, the displays on recipient computing devices may include graphical user interface (GUI) elements, such as buttons, that dynamically change based on the current preferred response mode indicated within invitation messages for a request.

In an embodiment, a user computing device may transmit invitation messages that include different preferred response modes for different recipients. For example, the user computing device may transmit a first invitation message for a request (e.g., "Who is at home right now?") to a first recipient computing device that indicates response messages should be formatted as SMS text messages, and may transmit a second invitation message for the request to a second recipient computing device that indicates response messages may be formatted for use in a PTT application. Further, the user computing device may utilize different preferred response modes for different requests. For example, the user computing device may transmit a first invitation message corresponding to a first request (e.g., "What is the address of the hotel?") that indicates a preferred response mode (or format) of SMS messages, and may transmit a second invitation message corresponding to a second request (e.g., "What is the boss's name?") that indicates a preferred response mode (or format) of PTT messaging. This may be relevant since this preferred response mode can be simultaneously different between the various active requests, and further may differ from the preferred mode for general communications (i.e., communications not related to active requests).

In various embodiments, preferred response modes included in invitation messages may indicate whether response messages may be transmitted to other recipient computing devices or exclusively transmitted to the user computing device. For example, an invitation message transmitted to a plurality of recipient computing devices may include a code that directs all responses to only the user computing device as opposed to broadcasting responses to all recipient computing devices participating in a request. All recipient computing devices may be updated based on evaluations of response messages received by only the user computing device. In other words, when a response message partially or completely fulfills a request, the user computing device may transmit updated invitation messages and/or cancellation messages to all recipient computing devices that may cause their respective displays to be automatically adjusted (e.g., remove the request, change the request, etc.).

Recipient computing devices may not be configured to actively track the presence of the user computing device, but instead may simply receive invitation messages that dynamically update solicited requests (and information about the user) over time. In other words, a passive presence (or "reverse" presence) scheme may be enabled by the various embodiments, in which recipient computing devices are effectively subscribed to the status of requests based on receiving invitation messages from the user computing device.

The various embodiment techniques may be applied to various communication platforms, such as PTT application communications, text messaging, and email messaging. For example, recipient computing devices may be configured to receive invitation messages as emails, text messages, or PTT messages that may be automatically updated, deleted, hidden, or otherwise changed based on subsequent invitation messages from a computing device. In an embodiment, a recipient computing device may utilize a recall function to delete email messages in response to receiving cancellation messages transmitted in response to a user computing device determining a related request has been fulfilled.

In an embodiment, a server, such as a cloud server or central service computing device, may be configured to route or relay invitation messages and response messages between user computing devices and recipient computing devices. Further, a server may be configured to push information (e.g., adjusted/updated requests and/or preferred response modes, etc.) or alternatively may be configured to update locally stored data that is periodically accessed by various other computing devices. In other words, in response to receiving an initial request from a requesting device, a server may enable a plurality of recipient computing devices to use polling mechanisms to eventually receive these requests from the server. For example, a server may be configured to utilize temporary code that describes an active request (e.g., a URL or other link to a locally stored data field, etc.) that may be accessed by recipient computing devices to determine whether a request has been fulfilled. Servers may also be configured to push code (e.g., via push notifications, SMS messages, etc.) that indicate how to access information regarding active requests, as well as that indicate how and when to refresh displays on recipient computing devices. For example, a server may transmit messages formatted for use in an application that cause a recipient computing device to update a display of active requests using a code.

It should be noted that the various embodiments are not intended to utilize webpages or other web services. For example, any locally stored data pushed or made available to recipient computing devices by a server should be considered data that is relevant only to active requests and not webpage data or other content typically used by browsers.

The various embodiments are beneficial in that they may provide a device user with a collaboration tool for convenient, non-disruptive solicitation of answers, information, actions, and other responses from other device users. With the embodiment techniques, users may more liberally push out requests for responses from others, as the automatic updating and clean-up operations of such requests may avoid out-of-date, redundant, or irrelevant solicitations. The embodiment techniques are not like known techniques for using read receipts for emails or deleting messages on a remote phone service, but instead utilize messaging to trigger automatic clean-up operations that seamlessly remove displays once requests from users are determined to be completely fulfilled. Further, the framework enabled by the various embodiments may be used in other advanced features, like group remote-assistance requests.

FIG. 1 illustrates a communication system 100 suitable for use in various embodiments. The communication system 100 may include a user computing device 102 (e.g., a smartphone mobile computing device, etc.) that may be connected via a connection 103 (e.g., a wireless connection) to a communications tower 150 (or base station) associated with a cellular or other wide area network 155 (e.g., LTE, 3G, CDMA, etc.) having a connection 151 to the Internet 115. In an embodiment, the user computing device 102 may be connected via a connection 104 to a router 120 (e.g., a WiFi router) associated with a local area network 125 (or LAN) having a connection 121 to the Internet 115. In another embodiment, the user computing device 102 may connected via a short-range wireless connection 105 (e.g., Bluetooth, Zigbee, WiFi Direct, RF, etc.) to a recipient computing device 180 (e.g., a smartphone, etc.) connected to the Internet 115 via a connection 181. The communication system 100 may also include a laptop computing device 185 having a connection 186 to the Internet 115, as well as a server computing device 110 having a connection 111 to the Internet 115.

The recipient computing device 180, server computing device 110, laptop computing device 185, and the user computing device 102 may be configured to execute various applications via their respective components, such as processor(s), memory(s), and transceiver(s) (not shown). For example, the user computing device 102 and the recipient computing device 180 may both be configured to execute chat applications, email client applications, SMS/MMS texting software, and/or a Push-To-Talk (PTT) application for communicating with other devices.

With the various connections, the computing devices 102, 110, 180, 185 may be capable of exchanging communications with one another, such as via Internet protocols. In particular, the user computing device 102 may be configured to transmit messages, such as invitation messages and cancellation messages via email, SMS/MMS text message, and/or PTT communications, via the various connections 103, 104, 105. For example, the user computing device 102 may transmit invitation messages related to a query (e.g., a question, a task, etc.) via the connection 104 to the router 120, which may relay the invitation messages to the server computing device 110 over the Internet 115. In an embodiment, the server computing device 110 may be configured to act as a proxy by relaying messages between the devices 102, 180, 185. In another embodiment, the server computing device 110 may be a cloud server or other central server device that is configured to process and otherwise facilitate communications related to requests, such as by transmitting invitation messages, cancellation messages, and processing response messages. For example, the server computing device 110 may be associated with a PTT application used to share requests between users.

Figure 2A:
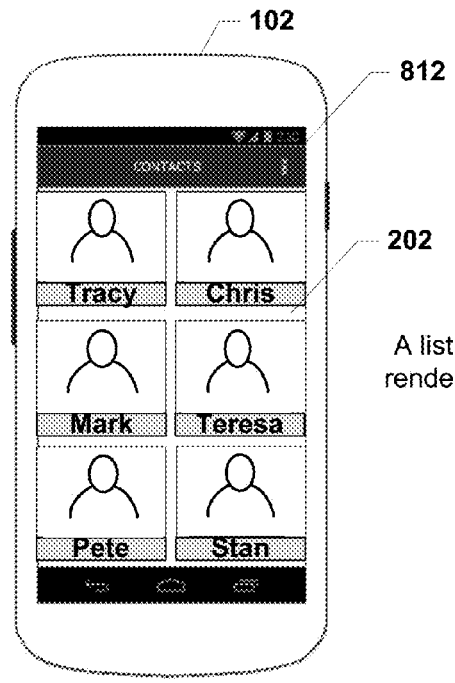
FIGS. 2A-2F are illustrations of a computing device showing example displays related to invitations soliciting responses from recipients.

FIGS. 2A-2F illustrate mobile computing devices rendering displays related to invitation messages soliciting responses from recipients. As shown in FIG. 2A, a user computing device 102 may be configured to execute a communications application or software, such as a Push-to-Talk (PTT) application (e.g., QChat, etc.) to generate a display 202 on its screen 812 that includes a graphical representation or list of contacts associated with the communications application. For example, the display 202 may represent an address book having the names and pictures of co-workers, friends, and/or family members having mobile computing devices also configured to utilize the communications application. The user of the user computing device 102 may browse the display 202 to find appropriate recipients for a request. For example, the user may use the display 202 to find employees that may be contacted in order to answer a question the user has (e.g., "Does anyone know if we followed up on the monthly reports?").

Figure 2B:
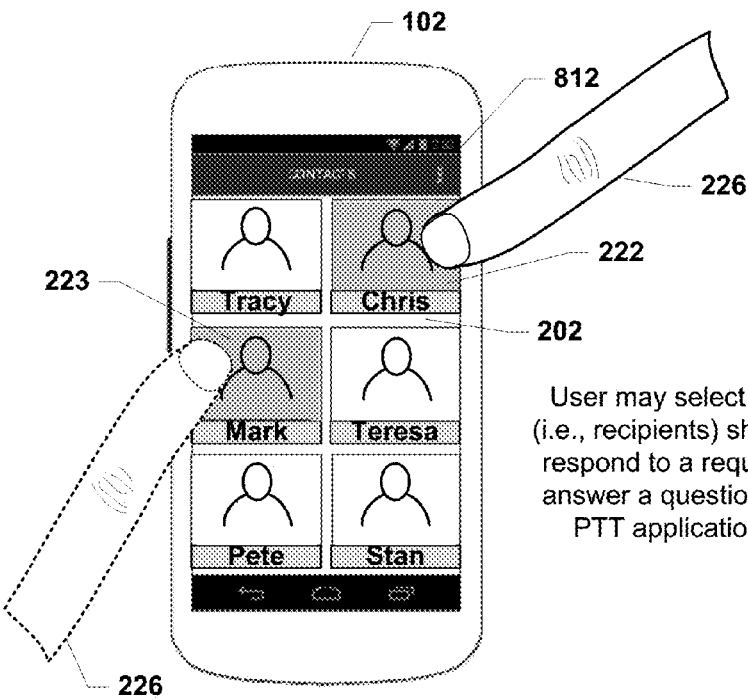

As shown in FIG. 2B, the user may select recipients for an invitation message that solicits responses to fulfill a request (e.g., answer a question, do a task, call via PTT application, etc.). In particular, using his/her finger 226, the user may provide user inputs (e.g., touch inputs) corresponding to rendered graphical elements 222, 223 of contacts or devices he/she desires to invite to address the request. For example, the user may select a first recipient by tapping on a first graphical element 222 associated with a first contact (referred to as "Chris" in FIGS. 2A-2B) and may select a second recipient by tapping on a second graphical element 223 associated with a second contact (referred to as "Mark" in FIGS. 2A-2B). Based on the selection inputs from the user, the invitation messages may be transmitted by the user computing device 102 to the recipient computing devices (i.e., the computing devices of the selected recipients). Such invitation messages may indicate the user's request that he/she speak with the recipients via the PTT application (e.g., the user putting the word out that he/she wants to hear from Chris and Mark, etc.). In various other embodiments, the invitation messages may include additional information about the user's request (e.g., specific information or answers to be provided by recipients, etc.).

Figure 2C:
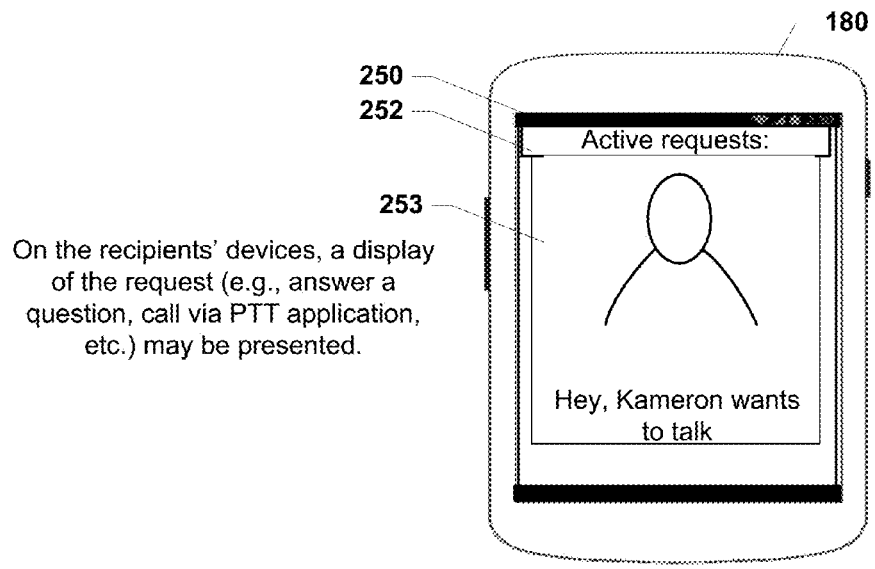

As shown in FIG. 2C, a recipient computing device 180 may render a display 252 of active requests on its screen 250 in response to receiving the invitation message from the user computing device 102. The display 252 may be a user interface that enables one or many dynamic elements to be presented to the recipient. In particular, based on received invitation messages, the display 252 may automatically update such as by adding a graphical element 253 for each active request that needs to be fulfilled. For example, the recipient computing device 180 may render a graphical element 253 that indicates the user is requesting the recipient to call via the PTT application. In an embodiment, the display 252 may be associated with a PTT application, such as the interface for a chat program.

Figure 2D:
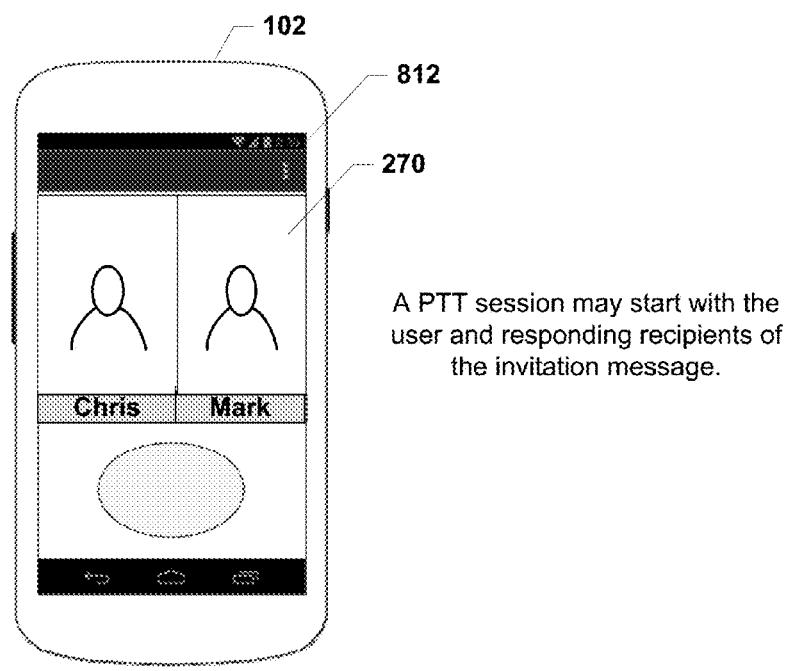

As shown in FIG. 2D, the user computing device 102 may participate in a PTT session in response to recipients responding to the user's request. The user computing device 102 may render a PTT session presentation 270 on the screen 812 that includes the recipients who have responded to the invitation message. In response to the PTT session with the recipients, the user's request may be fulfilled, and the user computing device 102 may transmit cancellation messages to the recipients' computing devices that indicate the request is no longer active.

Figure 2E:
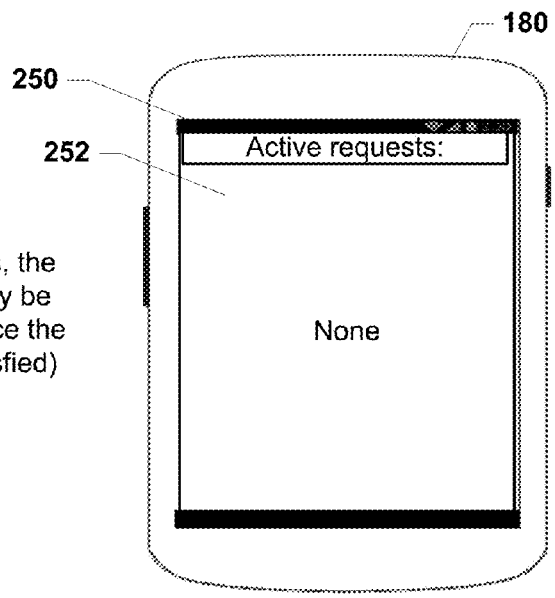
Figure 2F:
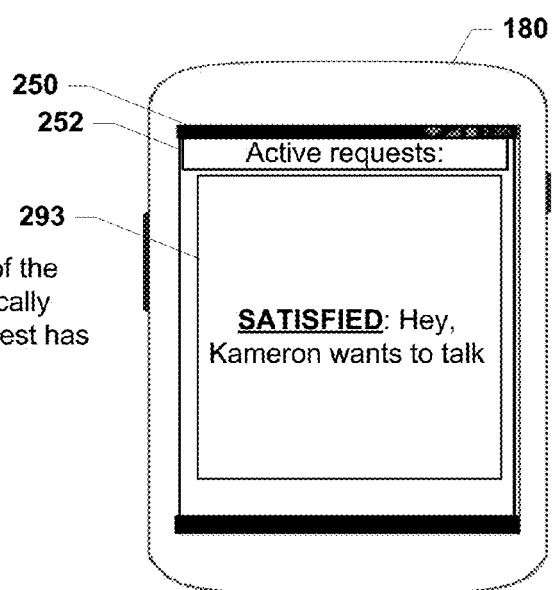

Upon receiving a cancellation message and as shown in FIG. 2E, the display 252 on the recipient computing device 180 may be automatically updated (or "cleaned-up") to delete, hide, or otherwise remove the request display elements. Alternatively, as shown in FIG. 2F, the display 252 may present an automatically adjusted graphical element 293 indicating that the request has been fulfilled based on the PTT session (e.g., "Satisfied," grayed-out, etc.).

Figure 3A:
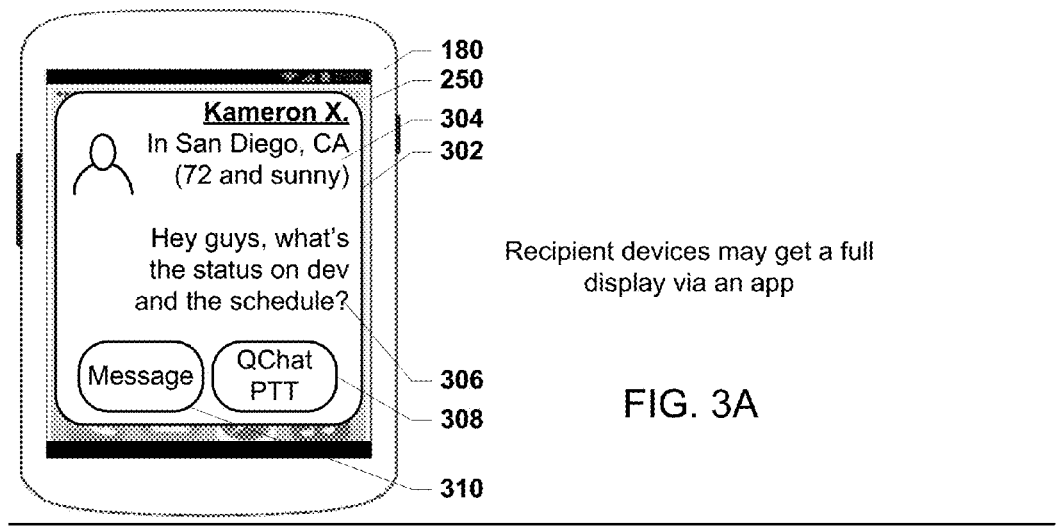
FIGS. 3A-3C are illustrations of a computing device showing example displays rendered in response to received invitation messages soliciting responses to requests.
Figure 3B:
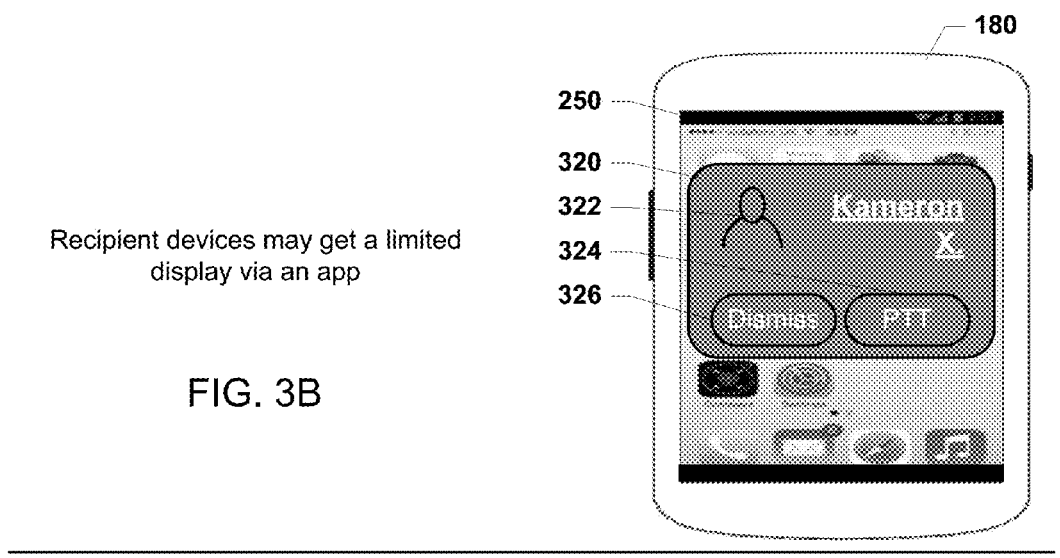

FIGS. 3A-3B are diagrams of exemplary displays rendered on a recipient computing device 180 in response to receiving invitation messages soliciting responses to a request. FIG. 3A illustrates a display 302 rendered on a screen 250 that may be presented when the recipient computing device 180 is executing a PTT application (e.g., QChat, etc.) that is configured to completely display messages related to invitation messages. In particular, the display 302 may include representations 304 of information about the user who transmitted the received invitation message, such as a user name (e.g., Kameron X.), the user's location, and other conditions or characteristics related to the user (e.g., current weather near the user, etc.). The display 302 may further include information about the request from the user, such as a question 306 posed by the user (e.g., "Hey guys, what's the status on development and the schedule?"). The display 302 may include user interface buttons, such as a first button 310 for transmitting a response message (e.g., a SMS text message with an answer) and a second button 308 for initiating a PTT session with the user associated with the request. In an embodiment, invitation messages may be completely displayed when the recipient computing device 180 is configured with an additional plug-in or other additional functionality not present in a standard the PTT application.

FIG. 3B illustrates a display 320 rendered on the screen 250 of the recipient computing device 180 that may be presented when the recipient computing device 180 is executing a PTT application (e.g., QChat, etc.) that is not capable of rendering complete displays of received invitation messages. In particular, the display 320 may include limited representations 322 of information about the user that transmitted the invitation message soliciting responses to a request. For example, the display 320 may only present the name and image of the user that issued the request. The display 320 may include user interface buttons, such as a first button 326 for dismissing the display 320 and a second button 324 for initiating a PTT session with the user associated with the request. In an embodiment, such a display 320 may be presented when the recipient computing device 180 is configured with just the PTT application (i.e., no additional plug-ins are utilized). In an embodiment, the display 320 may be an alert, such as a pop-up dialog box.

Figure 3C:
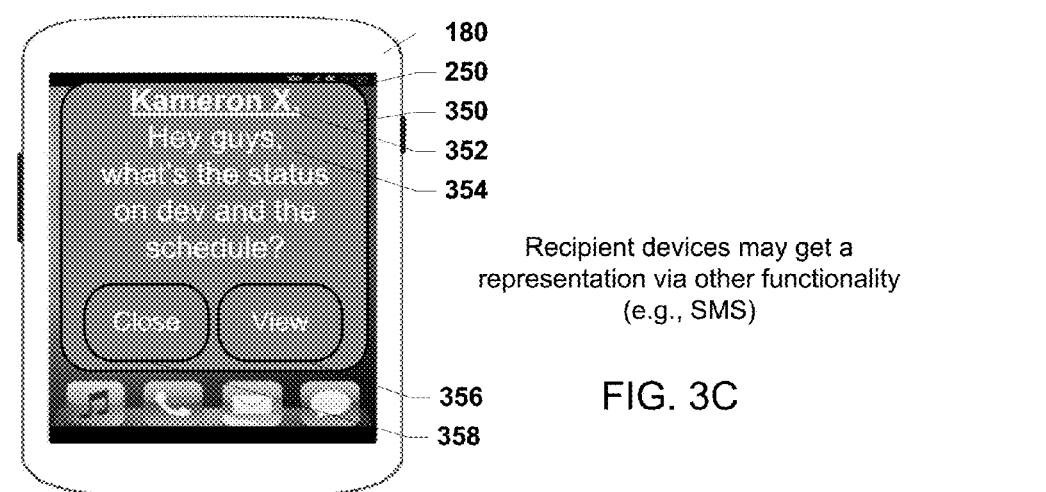

FIG. 3C illustrates another display 350 rendered on the screen 250 of the recipient computing device 180 that may be presented when the recipient computing device 180 is not configured to execute a PTT application (e.g., QChat, etc.). In particular, the display 350 may render information with other functionality, such as SMS/MMS text message viewers. In particular, the display 350 may include representation 352 of information about the user that transmitted the invitation message with the request, as well as information about the request from the user, such as a question 354 posed by the user. The display 350 may include user interface buttons, such as a first button 358 for closing the display 350 and a second button 356 for viewing more information related to the request and/or the invitation message.

FIGS. 4A-4E illustrate embodiment methods 400, 450, 470, 490, 495 for a computing device to transmit invitation messages that solicit responses to requests. For the purpose of simplicity, the following descriptions refer to a computing device as performing the operations of the methods 400, 450, 470, 490, 495. However, it should be appreciated that the computing device may be any computing device, such as a mobile computing device (e.g., a smartphone utilized by a user) or a server (e.g., a central server associated with a communication service or chat application). In various embodiments, any combination of the operations of the methods 400, 450, 470, 490, 495 may be performed by one or more computing devices. For example, a user's smartphone mobile computing device may be configured to receive an initial query from a user's inputs on a touchscreen and a server may be configured to transmit invitation messages to various devices based on the initial query. As another example, evaluation operations to determine the meaning or content of response messages from recipient computing devices may be offloaded to a server with a user's smartphone mobile computing device configured to transmit invitation messages directly to recipient computing devices, or vice versa.

Figure 4A:
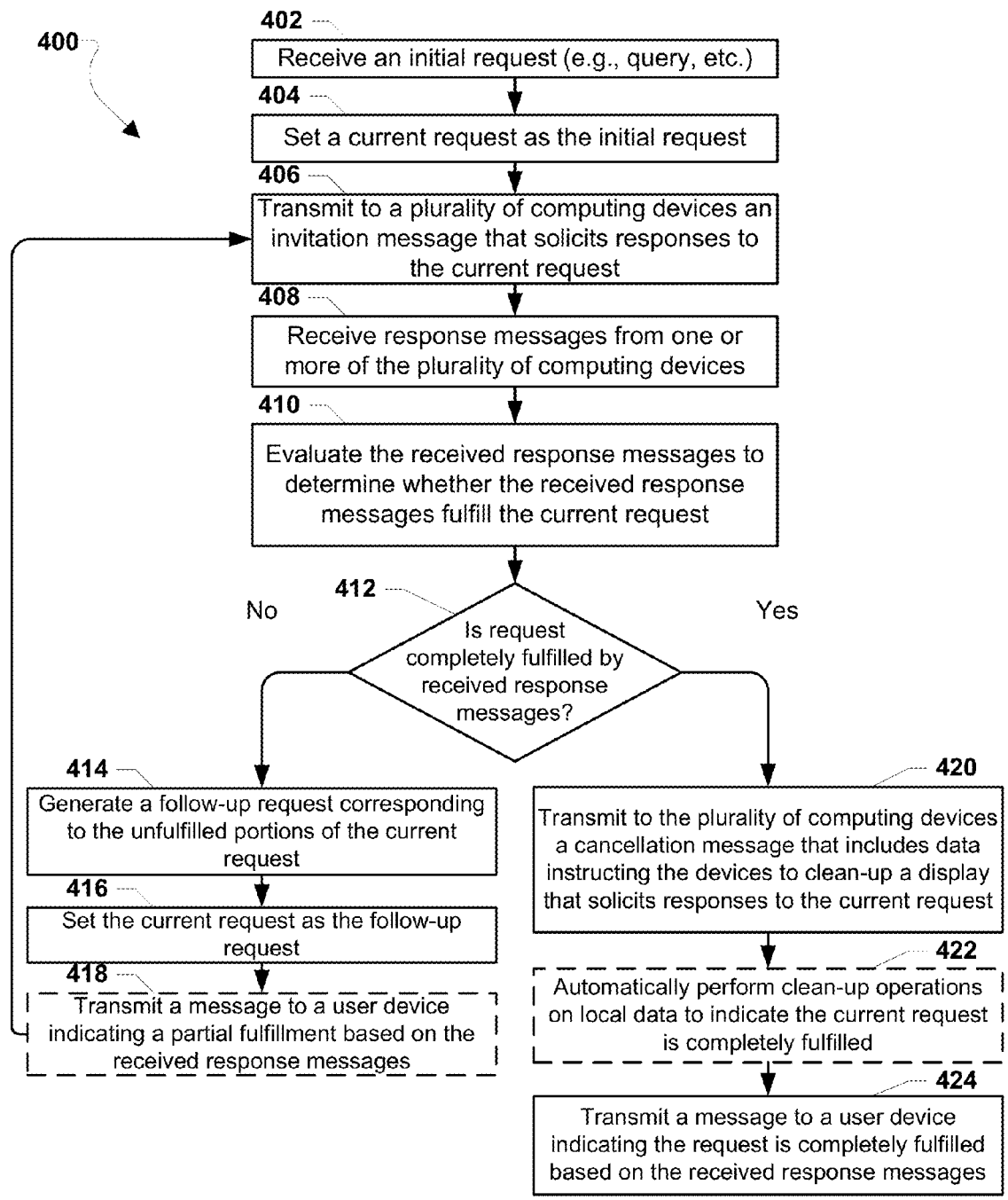
FIGS. 4A-4E are process flow diagrams illustrating embodiment methods for a computing device to transmit invitation messages based on requests from a user to recipient computing devices in order to solicit responses (e.g., information) desired by the user.

FIG. 4A illustrates an embodiment method 400 for a computing device to transmit invitation messages based on requests from a user to recipient computing devices in order to solicit responses (e.g., information, tasks, actions, etc.) desired by the user. In block 402, the processor of the computing device may receive an initial request. The initial request may be a query or question from the user. For example, the initial request may be the text question "Does anyone know when the meeting starts?" The initial request may alternatively be a task, objective, assignment, and/or action request. For example, the initial request may include a request for a co-worker or friend to go retrieve an item from an office or room. The initial request may also indicate the intended recipients for corresponding invitation messages, such as the selection of contacts from an address book that should receive an invitation to answer a question. The recipients (and recipient computing devices) may be based on selection inputs by the user, as described above with reference to FIG. 2B. Alternatively, the recipients may be identified based on an analysis of the contents or topic of the request, as described below with reference to the operations in block 406. The initial request may be received by the computing device via sensors (e.g., microphone, camera, touch sensors, etc.), peripheral inputs (e.g., via mouse, keyboard, etc.), and/or via a message. For example, the computing device may receive the initial request as a text interrogatory entered into an application via touch inputs on a virtual or soft keyboard. As another example, the computing device may receive from another device a proprietary application message, a SMS text message, a PTT audio message, an email, or other communication that includes a request (e.g., an SMS text message posing a question for a group of co-workers, etc.).

In block 404, the processor of the computing device may set a current request as the initial request. The setting operations may include adjusting a system variable value, setting a flag or bit, or storing any other information to indicate the content of the current request. For example, the computing device may store a text string or audio sample that represents the user's question "What is the status of our project?" In various embodiments, the computing device may be configured to maintain a plurality of current requests for each user, such as an unanswered question or task for different recipient groups. For example, the computing device may store a current outstanding query to family members of the user, a current task for co-workers, a current invitation for siblings to join a PTT session, etc.

In block 406, the processor of the computing device may transmit to a plurality of computing devices (i.e., recipients computing devices) an invitation message that solicits responses to the current request. The invitation message may include representations of the current request, such as text describing the user's objective or a question to be posed. For example, when the computing device is a server, the server may transmit invitation messages to the recipient computing devices based on an initial request received in a transmission from a user's mobile device. As another example, when the computing device is a user's mobile device, the mobile device may transmit the invitation messages to nearby devices using P2P communications, etc. Further the invitation message may include the preferred response mode that recipient computing devices should use to transmit response messages to the computing device. For example, the invitation message may include a code, symbol, variable, bit, or other information that indicates whether response messages should be transmitted via a PTT application, SMS/MMS text message, email, or other message format. The preferred response mode may also include destination addresses or contact information, such as an IP address, phone number, etc. I In various embodiments, the preferred response mode for response messages may be determined dynamically by the computing device based on current operations or conditions of the computing device, such as voice calls, GPS coordinates, calendar events, or user inputs. For example, the computing device may indicate in the invitation message that only SMS text messages should be sent as response messages when the user is participating (or is scheduled to soon participate) in a voice call as indicated in a locally stored calendar. The preferred response mode may change over time, and accordingly may be different from one invitation message to the next invitation message. For example, in an initial invitation message, the computing device may include data indicating that any type of response message format may be used, however a subsequent, updated invitation message (as described below) may include data indicating that only PTT application messages may be acceptable as the user is within his/her car. In an embodiment, other information about the conditions or status of the computing device and/or the user initiating the request may be included within the invitation message, such as location or weather information. The invitation message may also include data (e.g., metadata, header information, etc.) that indicates an association with a particular application executing on the recipient computing device, such as a PTT application, and may also include data indicating the presence of a request from another user. For example, the invitation message may be formatted such that a recipient computing device may recognize that a request has been received.

The computing device may transmit the invitation message to recipients based on usernames, phone numbers, IP addresses, or other contact information indicated within the received initial request. For example, the computing device may transmit the invitation message to the mobile computing devices associated with usernames indicated within the received initial request that are also cross-referenced in a locally stored address book, such as a PTT application contact list. In an embodiment, the computing device may also store codes or other identifiers within a local data structure, such as an array, system variable, etc., to identify the transmitted invitation message and/or the current request. This stored information may be compared with incoming messages to identify response messages from recipient computing devices.

The invitation message may be transmitted by the computing device via P2P techniques, Internet protocols, and/or any other means of transmission. For example, the computing device may utilize a Bluetooth communication link to transmit the invitation message to a first recipient computing device, and may utilize a cellular network WAN to transmit the invitation message to a second recipient computing device. Further, the invitation message may be configured in various formats, types, and/or structures. For example, the invitation message may be transmitted by the computing device as an email, a proprietary message utilized by software executing on recipient computing devices (e.g., a PTT application), an SMS/MMS text message, etc. In an embodiment, the computing device may transmit redundant messages in different message formats to the plurality of computing devices. For example, the computing device may transmit the invitation message to a first recipient computing device as both an email and a PTT application message to ensure that the invitation message is received by the recipient computing device in the most convenient or efficient manner.

In another embodiment, the computing device may determine the recipient computing devices that may receive the invitation message based on the content, topic, or purpose of the initial request. In other words, the computing device may process text, audio, or other information within the received initial request from the user to identify the most appropriate recipients for the invitation message soliciting responses to the request. For example, the computing device may perform natural language processing on a text question within the initial request to determine that the question relates to a work project, and thus may identify co-workers in the user's stored contact list that may be appropriate to respond to the request.

In block 408, the processor of the computing device may receive response messages from one or more of the plurality of computing devices. For example, the computing device may monitor an incoming message buffer to identify incoming PTT application messages from various recipient computing devices that received the invitation message. The computing device may evaluate data within incoming messages to determine whether the incoming messages are response messages to the transmitted invitation message and the current request. In particular, the computing device may compare codes, timestamps, identifiers, or other information within metadata or header information of the incoming messages to locally stored information related to the invitation message and/or the current request. In another embodiment, the computing device may determine that incoming messages are response messages corresponding to the transmitted invitation message based on content processing of the incoming messages. For example, an incoming email may be determined to be a response message to the invitation message based on the interpreted meaning of the text within that email (e.g., the email may address, answer, or follow-up on the request of the invitation message).

In block 410, the processor of the computing device may evaluate the received response messages to determine whether the received response messages fulfill the current request. The computing device may perform various processing routines or software instructions, such as natural language processing and/or speech recognition routines, to process and interpret the content and meaning of the received response messages. For example, the computing device may perform speech-to-text processing on received audio response messages and also natural language processing routines on the obtained text. As another example, the computing device may perform operations to analyze the grammatical structure, punctuation, phrasing, idiomatic connotations, contextual meanings, and other information of text of received email response messages. As another example, the computing device may evaluate the pitch, inflection, timing, and pronunciation of words to infer the meaning from a recipient's received audio response message.

The computing device may compare the inferred meaning of a received response message to the current request indicated by the invitation message to determine whether the response message indeed provides an appropriate answer to the current request. For example, the computing device may evaluate whether a response message includes a time (e.g., "noon") when the current request includes a question soliciting the time of a meeting from co-workers. As another example, when the current request solicits a phone number, the computing device may evaluate a response message to determine whether it contains information representing ten digits that may actually be a phone number. As another example, the computing device may detect that received response messages pose follow-up questions (e.g., include text that ends with question marks, etc.) instead of provide declarations in response to a current query that includes a question. As an illustration: the computing device may determine that the current request posing a first question "Who is in the office?" is not fulfilled by a response message that includes a second question "Which office are you talking about?" In an embodiment, the computing device may evaluate a response message to determine whether a current request for recipients to perform an action has been successfully completed. For example, when the current request is an order for co-workers to retrieve a document from an office, the computing device may determine that a response message indicating that the office door is locked (e.g., "Sorry, the door is locked and I can't get in.") does not fulfill the current request.

Based on the evaluations, in determination block 412, the processor of the computing device may determine whether the current request is completely fulfilled by received response messages. If it is determined that the current request is not completely fulfilled (or answered) by the received response messages (i.e., determination block 412="No"), in block 414, the processor of the computing device may generate a follow-up request corresponding to the unfulfilled (or unanswered) portions of the current request. In other words, the follow-up request may include additional queries, statements, and/or instructions to solicit additional information, actions, or responses from the recipients. For example, when the current request indicated by the transmitted invitation message included a two-part question (e.g., "Who is in the office and how long will you be around?") and the computing device determines that a response message only answered a portion (e.g., "I'm here."), the computing device may generate a follow-up question to the recipient that solicits the missing answer (e.g., "OK, how long will you be there?"). As another example, when the current request included a task (e.g., "Please get the file from my office.") and the computing device determines that a received response message did not fulfill the task (e.g., "Sorry, but the office is locked."), the computing device may generate a follow-up task (e.g., "OK, please contact the office manager who should have the office key, and then get the file.").

In block 416, the processor of the computing device may set the current request as the follow-up request, such as by updating a system variable or other stored information indicating the current request. In optional block 418 the processor of the computing device may transmit a message to a user device indicating a partial fulfillment based on the received response messages. For example, when the computing device determines that response messages were received but only included partial answers to the question posed by the current request, the partial answers may be rendered on a display or transmitted as a communication (e.g., an email, SMS/MMS text message, audio message, or PTT application message). In various embodiments, the user device may be the computing device itself (e.g., the computing device may render a message on a display), a recipient computing device, or a server. The computing device may then continue with the operations in block 406 to transmit subsequent (or updated) invitation messages that indicate the new current request.

If it is determined that the current request is completely fulfilled by the received response messages (i.e., determination block 412="Yes"), in block 420, the processor of the computing device may transmit to the plurality of computing devices a cancellation message that includes data instructing the devices to clean-up (e.g., remove) a display that solicits responses to the current request. In other words the computing device may transmit a message that causes recipient computing devices that received the invitation message to perform clean-up operations that remove, delete, hide, or otherwise adjust their respective displays. For example, the cancellation message may include a code, script, or other data that may be used by an application executing on a recipient computing device to automatically delete, hide, or adjust an entry in a database and/or graphical element associated with the current request. In this way, recipient computing devices may be instructed to remove indicators that would cause recipient users to act or otherwise respond to the already fulfilled current request. In various embodiments, cancellation messages transmitted with the operations in block 420 may also include answers or other information related to the complete fulfillment of the current request. For example, all recipient computing devices may receive the answer to the current request's question along with a code to mark the current request as "completed" or "satisfied."

In optional block 422, the processor of the computing device may automatically perform clean-up operations on local data to indicate the current request is completely fulfilled. The operations in optional block 422 may be utilized when the computing device is configured to store data associated with the current request that may be provided to various devices. For example, the computing device may remove, hide, or adjust entries in a database and/or graphical elements associated with the current request. In an embodiment, when the computing device is a server, the operations in optional block 422 may include updating information that is periodically pushed or downloaded by recipient computing devices. For example, the computing device may nullify, delete, or otherwise zero-out status data corresponding to the current request, thereby disabling the current request from being displayed or otherwise indicated to recipient computing device users. In block 424, the processor of the computing device may transmit a message to a user device indicating the request is completely fulfilled based on the received response messages. For example, when the computing device determines that response messages were received and fully answered the question posed in the current request, the answer may be rendered on a display or transmitted as a communication (e.g., an email, SMS/MMS text message, audio message, or PTT application message).

Figure 4B:
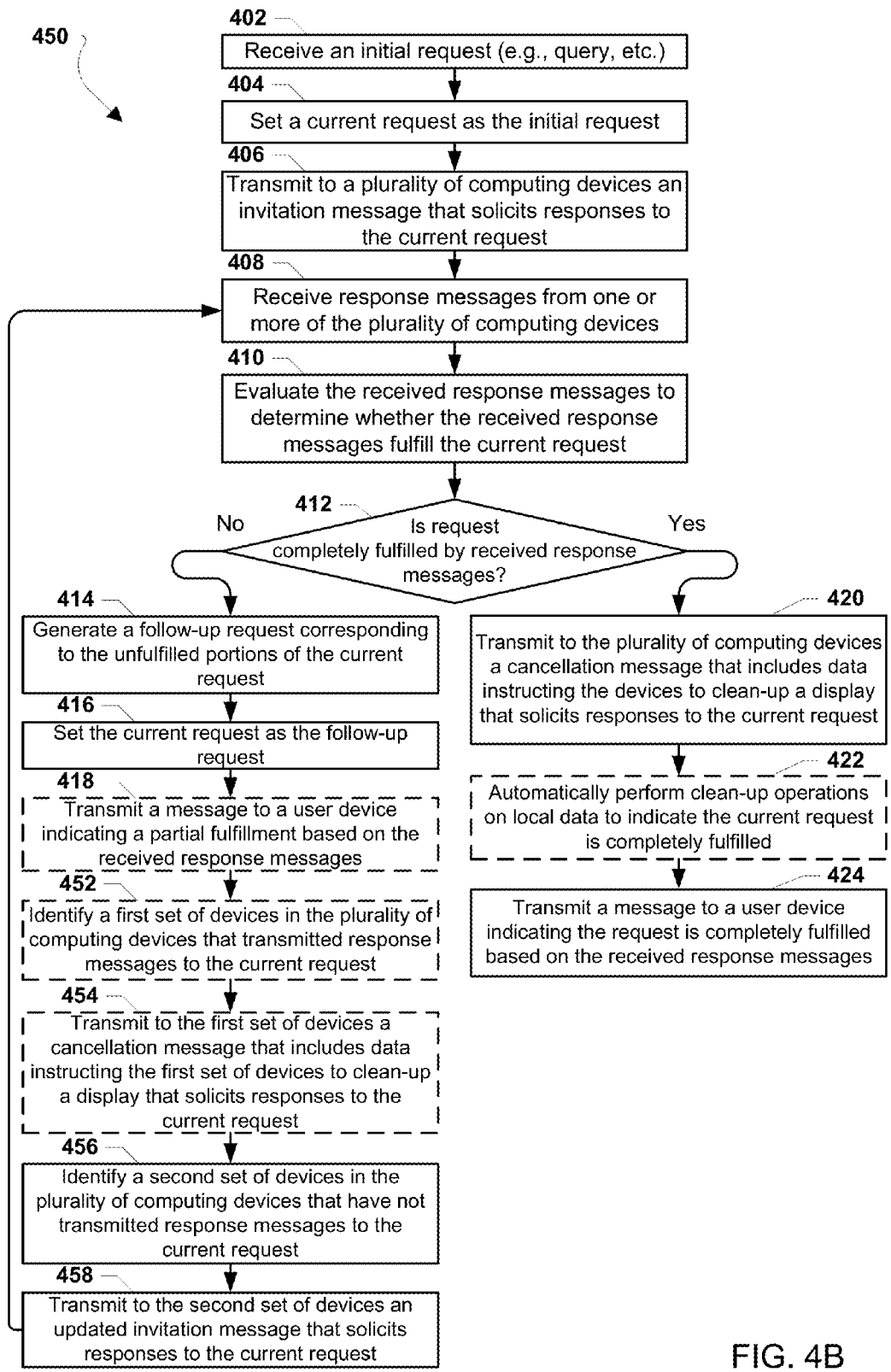

FIG. 4B illustrates an embodiment method 450 for a computing device to transmit invitation messages based on requests from a user to recipient computing devices in order to solicit responses (e.g., information, tasks, actions, etc.) desired by the user. The method 450 is similar to the method 400 described above, except that the method 450 may include operations for distinguishing between recipient computing devices that have and have not responded to invitation messages, thereby enabling the computing device to transmit updated invitation messages to only those devices that have not responded to the original request. In this way, redundant messages to recipients already represented or that have already participated in a request may be avoided. For example, when a user desires some information from his work colleagues (e.g., "What is the name of that guy that brings the sandwiches?"), recipients of the invitation message replying with inconclusive information (e.g., "No clue," "Maybe it starts with an 'S'") may not be contacted again.

As described above, in block 402, the processor of the computing device may receive an initial request. In block 404, the processor of the computing device may set a current request as the initial request. In block 406, the processor of the computing device may transmit to a plurality of computing devices (i.e., recipient computing devices) an invitation message that solicits responses to the current request. In block 408, the processor of the computing device may receive response messages from one or more of the plurality of computing devices. In block 410, the processor of the computing device may evaluate the received response messages to determine whether the received response messages fulfill the current request.

Based on the evaluations, in determination block 412, the processor of the computing device may determine whether the current request is completely fulfilled by received response messages. If it is determined that the current request is not completely fulfilled (or answered) by the received response messages (i.e., determination block 412="No"), in block 414, the processor of the computing device may generate a follow-up request corresponding to the unfulfilled (or unanswered) portions of the current request. In block 416, the processor of the computing device may set the current request as the follow-up request, such as by updating a system variable or other stored information indicating the current request. In optional block 418 the processor of the computing device may transmit a message to a user device indicating a partial fulfillment based on the received response messages.

In optional block 452, the processor of the computing device may identify a first set of devices in the plurality of computing devices that transmitted response messages to the current request. For example, the computing device may identify a list of identifiers of recipient computing devices that are associated with received respond messages to the current request. In optional block 454, the processor of the computing device may transmit to the first set of devices a cancellation message that includes data instructing the first set of devices to clean-up (e.g., remove) a display that solicits responses to the current request. For example, when the first set of devices are associated with response messages that do not answer the current request (e.g., "I don't know the answer, sorry."), the computing device may remove these devices from further communications regarding the current request and instruct the devices to automatically hide or delete the current request from their displays.

In an embodiment, the computing device may also be configured to perform automatic clean-up operations on locally stored data related to the first set of devices in response to receiving response messages from the first set of devices. For example, when a recipient computing device transmits a response message indicating the current request is not valid for that recipient, the computing device may remove any stored notifications for the recipient and/or update a data table to indicate the recipient is no longer on the list of recipients for the current request. This may be beneficial when a response messages is received that indicates the invitation message was mistakenly sent to a recipient device (e.g., the recipient is not an appropriate contact for a business-related question, the recipient is no longer in a building related to the current request, etc.).

In block 456, the processor of the computing device may identify a second set of devices in the plurality of computing devices that have not transmitted response messages to the current request, and transmit to the second set of devices an updated invitation message that solicits responses to the current request in block 458. For example, the updated invitation message may be sent to those contacts that have not yet responded whether they know some information. In addition, the updated invitation message may include relevant conclusions or additional information determined based on the already received response messages from the first set of devices. For example, the updated invitation message may state the partial responses and reiterate the current request (e.g., "Guys, we have narrowed who the sandwich guy's name down to a name that starts with an 'S' but we still don't know that name. Please help!"). The computing device may then continue with the operations in block 408 to receive subsequent response messages responding to the updated invitation message.

If it is determined that the current request is completely fulfilled by the received response messages (i.e., determination block 412="Yes"), in block 420, the processor of the computing device may transmit to the plurality of computing devices a cancellation message that includes data instructing the devices to clean-up (e.g., remove) a display that solicits responses to the current request. In optional block 422, the processor of the computing device may automatically perform clean-up operations on local data to indicate the current request is completely fulfilled. In block 424, the processor of the computing device may transmit a message to a user device indicating the request is completely fulfilled based on the received response messages.

Figure 4C:
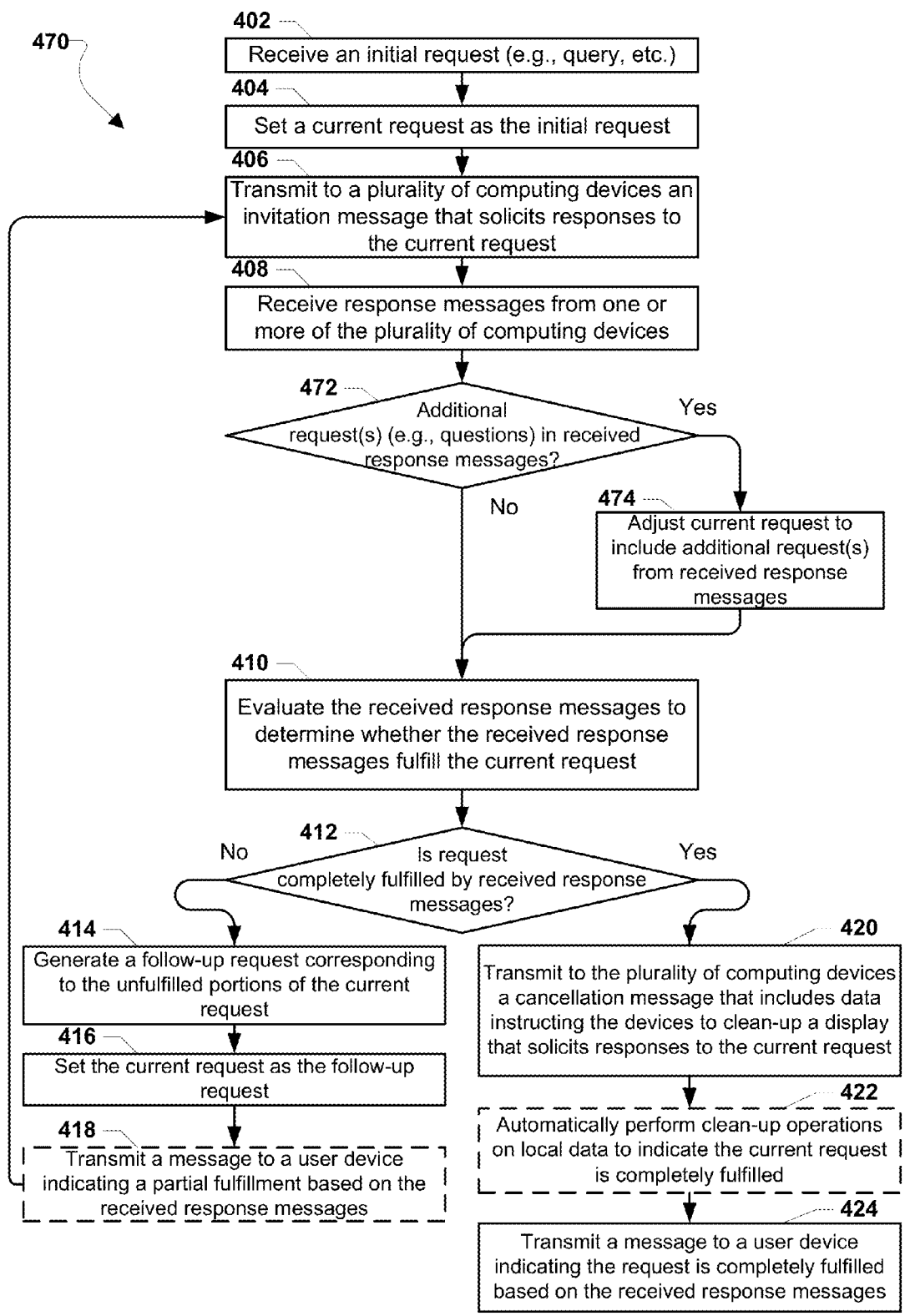

FIG. 4C illustrates an embodiment method 470 for a computing device to transmit invitation messages based on requests from a user to recipient computing devices in order to solicit responses (e.g., information, tasks, actions, etc.) desired by the user. The method 470 is similar to the method 400 described above, except that the method 470 may include operations that enable recipients to adjust a current request (e.g., a query) based on their response messages. For example, in response to a request for co-workers to get a file from an office, a response message may include a question "Where is the key to the office?" Based on such responses, the computing device may adjust requests to include questions raised by previous responses.

As described above, in block 402, the processor of the computing device may receive an initial request. In block 404, the processor of the computing device may set a current request as the initial request. In block 406, the processor of the computing device may transmit to a plurality of computing devices (i.e., recipient computing devices) an invitation message that solicits responses to the current request. In block 408, the processor of the computing device may receive response messages from one or more of the plurality of computing devices.

In determination block 472, the processor of the computing device may determine whether additional request(s) (e.g., questions, tasks, etc.) are included in the received response messages. For example, the computing device may analyze text or audio responses to detect questions based on punctuation or speech inflection (e.g., "I can help, but do you have a key to the office door?"). As another example, the computing device may perform natural language processing on a received PTT message to determine whether a respondent indicates that he/she needs additional information or assistance in order to fulfill the current request (e.g., "I need someone to unlock the office for me."). If it is determined that additional request(s) are in the received response messages (i.e., determination block 472="Yes"), in block 474, the processor of the computing device may adjust the current request to include additional request(s) from received response messages. In other words, the computing device may append additional limitations, questions, tasks, etc. to the current request. For example, based on response messages indicating that the office door is locked, the computing device may adjust a current request for co-workers to retrieve a file from the office to also include tasks for someone to unlock the office door. In this way, the scope of queries, questions, tasks, and other information solicited by the current request may be modified by the responses.

As an illustration: the initial request from a user may be a task for co-workers to turn on a computer within an office. A first response message in response to the related invitation message transmitted by the computing device may indicate the office is locked and that a key is needed (e.g., "Who has the office key?"). A second response message may indicate that a recipient does not know how to turn on the computer, but that he can help other people get into the office (e.g., "Sorry, I know nothing about computers, but I do have office keys if anyone needs them."). The computing device may then adjust the current request to ask for co-workers to both unlock the office and retrieve the computer file (e.g., "Tom, since you have keys, please meet Jack at the office so he can turn on the computer.").

If it is determined that no additional request(s) are in the received response messages (i.e., determination block 472="No") or the operations in block 474 have been performed, in block 410, the processor of the computing device may evaluate the received response messages to determine whether the received response messages fulfill the current request. Based on the evaluations, in determination block 412, the processor of the computing device may determine whether the current request is completely fulfilled by received response messages. If it is determined that the current request is not completely fulfilled (or answered) by the received response messages (i.e., determination block 412="No"), in block 414, the processor of the computing device may generate a follow-up request corresponding to the unfulfilled (or unanswered) portions of the current request. In block 416, the processor of the computing device may set the current request as the follow-up request, such as by updating a system variable or other stored information indicating the current request. In optional block 418 the processor of the computing device may transmit a message to a user device indicating a partial fulfillment based on the received response messages. The computing device may then continue with the operations in block 406 to transmit subsequent (or updated) invitation messages that indicate the new current request.

If it is determined that the current request is completely fulfilled by the received response messages (i.e., determination block 412="Yes"), in block 420, the processor of the computing device may transmit to the plurality of computing devices a cancellation message that includes data instructing the devices to clean-up (e.g., remove) a display that solicits responses to the current request. In optional block 422, the processor of the computing device may automatically perform clean-up operations on local data to indicate the current request is completely fulfilled. In block 424, the processor of the computing device may transmit a message to a user device indicating the request is completely fulfilled based on the received response messages.

Figure 4D:
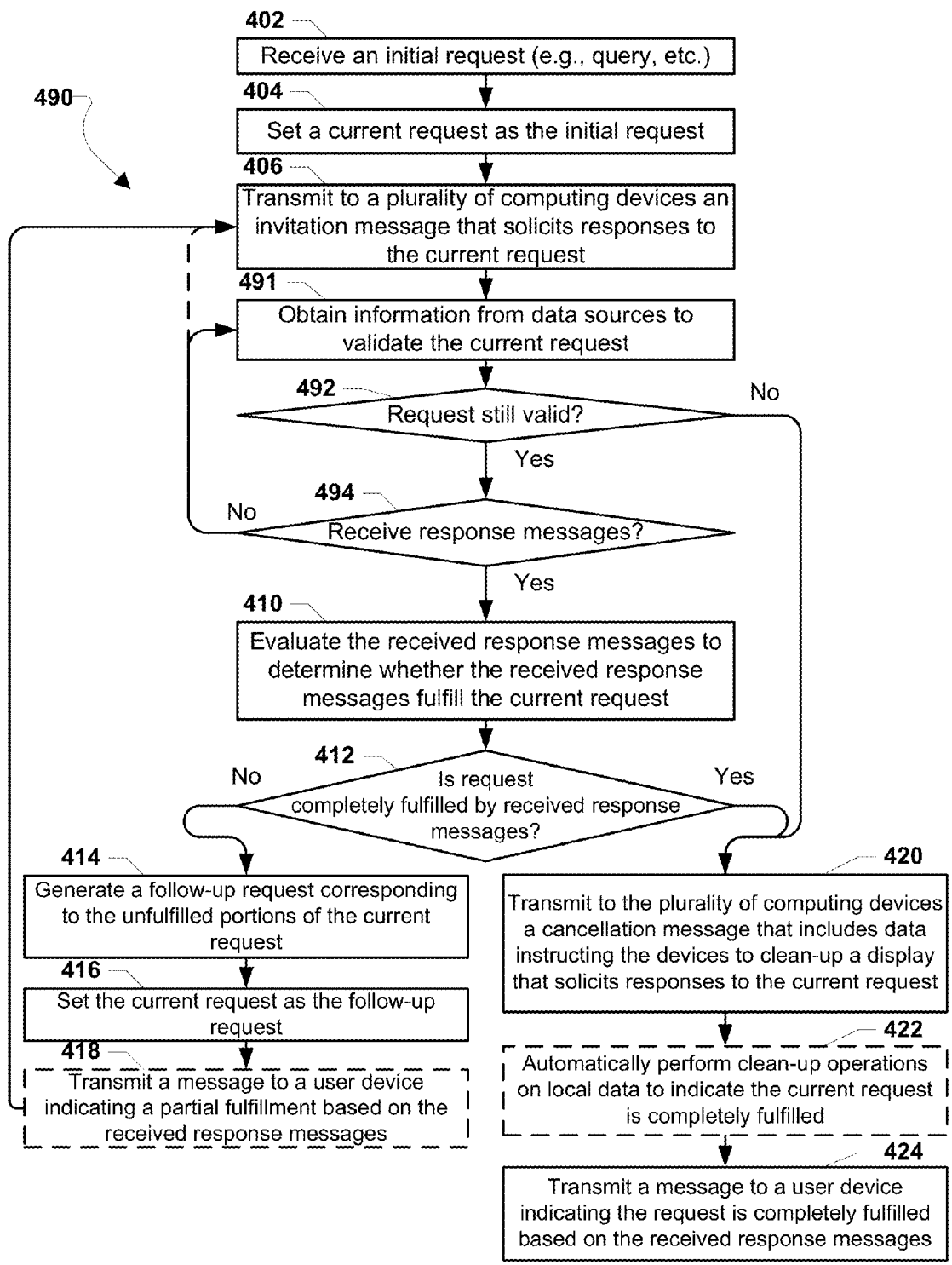

FIG. 4D illustrates an embodiment method 490 for a computing device to transmit invitation messages based on requests from a user to recipient computing devices in order to solicit responses (e.g., information, tasks, actions, etc.) desired by the user. The method 490 is similar to the method 400 described above, except that the method 490 may include operations for terminating a current request that ceases to be valid. For example, when a current request includes a request for family members to volunteer to take a user to the airport for a 4:00 PM flight and the current time is 5:00 PM, the current request may no longer be valid and thus may be automatically removed from recipient computing device displays. In other words, in addition to handling satisfied (or fulfilled) requests, the method 490 may be performed to trigger automatic clean-up operations related to requests that are invalid, irrelevant, expired, and/or pointless, especially when no related responses were ever received at the computing device.

As described above, in block 402, the processor of the computing device may receive an initial request. The initial request may be a query or question from the user, such as a text interrogatory entered into an application via touch inputs. In block 404, the processor of the computing device may set a current request as the initial request. In block 406, the processor of the computing device may transmit to a plurality of computing devices (i.e., recipient computing devices) an invitation message that solicits responses to the current request.

In block 491, the processor of the computing device may obtain information from data sources for use in validation of the current request, such as from a time measurement unit, a source of location information (e.g., a GPS unit or other unit, module or service that provides location information service), a local information database, and/or an Internet resource. For example, the computing device may access locally stored data (e.g., a stored calendar, an address book, data related to an email client, stored text messages, social networking profile data, etc.) and/or perform operations to retrieve data from various websites via the Internet. Relevant information may also be obtained via user inputs, such as touch inputs on a touchscreen. Further, the information may be obtained based on processing the content of the current request and/or invitation message, such as by performing natural language processing routines on an email or SMS text message to determine the meaning of a question, statement, or other information for the current request. For example, when the current request asks "Who will be in the office at noon?" the computing device may obtain the current time from a time measurement unit (e.g., a system clock, etc.) to determine whether the request is still valid based on the current time. In this example, the computing device may automatically clean up or delete the request some time after noon as by that time the request would no longer be relevant.

In an embodiment, the computing device may be configured to utilize a web search form, such as Google®, Bing®, etc., to submit natural language or keyword queries based on the current request and retrieve data that may be used in validating or determining the continued relevance of the current request. For example, when the current request asks friends (i.e., recipients) for opinions about a sporting team (e.g., "Who thinks the X Team should fire their coach?"), the computing device may submit an Internet search using keywords about the sporting team (e.g., "coach," "fire," "X Team," etc.) and evaluate any search results relevant to the current request (e.g., articles about the team or the coach, etc.) In this embodiment, the computing device may perform additional operations to processes any search results in order to assess the credibility of any data obtained via Internet searches, such as by comparing source websites to known or trusted website addresses. For example, the computing device may only analyze articles for data related to a sporting team that come from verified sporting sources, like a sporting news website or the official website of the sporting team itself. In an embodiment, the computing device may download news feeds or other live data that may be evaluated to determine the validity of the current request. For example, the computing device may access and/or download digital television guides, and/or news broadcasts in response to interpreting language within the current request that related to a football game to take place in the near future.

In determination block 492 the processor of the computing device may determine whether the current request is still valid, such as by using the information obtained from web searches. In other words, the computing device may evaluate the information obtained from web searches against the current request to determine whether the current request is moot or otherwise incapable of being properly fulfilled or answered by the recipient computing devices that may have received an invitation message with the current request. In other words, the computing device may evaluate conditions or details of the questions or tasks included in the current request to determine whether the user may still need the request to be fulfilled. For example, if the web search reveals that a posed question is now moot or the answer is now public knowledge, the computing device may conclude that the current request is no longer valid, causing automatic clean-up operations to be performed at recipient computing devices (e.g., display an "expired" indicator, etc.).

In the operations in determination block 492, the computing device may interpret the language or contextual information within the request, invitation messages, and/or response messages, and may identify wording, codes, and/or symbols to be compared with obtained information to determine (or infer) whether requests are still fresh or otherwise valid. For example, the computing device may evaluate locally stored or accessible data related to the user, such as a stored calendar (e.g., business appointment book, etc.), to determine a current request related to an upcoming meeting is still valid when there is a calendar event active for that meeting. As another example, the computing device may determine that a subsequently received user input, such as a touch input on a graphical element within a PTT application that corresponds to a "dismiss" function, indicates that the current request is no longer valid or that the user no longer desires fulfillment for the current request.

In various embodiments, the computing device may utilize time-sensitive (or time-based) conditions or factors encompassed or implied within the current request when making validity determinations. In particular, the computing device may determine on its language (e.g., a spoken or text reference to a time, day, week, month, etc.) whether the current request is relevant to or dependent upon a time of day or date, and may compare current time data from the obtained information (e.g., current time of day from a system clock, etc.) to determine whether the current request is still valid. For example, in response to determining both that a request requires information prior to a certain time of day (e.g., "what time will the meeting start this morning?") and that the time of day has already passed (e.g., the current time is already 2:00 PM), the computing device may determine the request is invalid, causing automatic clean-up operations to be performed at recipient computing devices (e.g., display an "expired" indicator, etc.). As another example, when the current request asks "Does anybody want to go to lunch with me today?" the computing device may determine that the current request is invalid when it determines that the current time is past typical lunch hours (e.g., it is currently several minutes/hours past noon). Such time-sensitive conditions may not include explicit timelines or end points, such as a definitive time of day (e.g., 1:00 PM, etc.), but instead may be related to an open-ended event. For example, a current request asking friends "who will win the big football game tonight?" may be valid for an indeterminate period, as football games often continue past their scheduled end times. In this way, the computing device may be configured to invalidate or otherwise close requests based on whether a time-based quality, characteristic, question, or other element of the request has been passively resolved over time without response messages.

In an embodiment, the validity determinations may utilize time-to-live (TTL) information associated with the current request, such as included within the received initial request and/or other user inputs. For example, the initial request may include a freshness threshold or amount of seconds, minutes, days, etc. during which the computing device may continue to receive response messages and fulfill the current request. As another example, a user-defined TTL condition (e.g., via a touch input, etc.) may expire prior to the receipt of any response message that fulfills a request, causing the computing device to determine that the request is no longer valid (e.g., "expired").

In various embodiments, the computing device may evaluate relevance, and contextual conditions or factors contained within the current request against information obtained from various data sources that enables the computing device to determine whether the request remains relevant when making validity determinations. For example, based on a language analysis of a current request that asks friends "Who thinks the team will fire their coach?," the computing device may compare information about the team add/or the coach within news articles or press releases obtained via news feeds and/or automated Internet searches to determine whether the coach has already been fired, has already signed a new contract, etc.

In various embodiments, the computing device may utilize location-based conditions or factors of the current request when making validity determinations. In particular, the computing device may determine whether the current request is related to or dependent upon a location, with this determination being made based on the request's language (e.g., a spoken or text reference to a street address, known location name, GPS coordinates, etc.) or other data associated with the request (e.g., a user-defined GPS marker or other geographical positioning information). The computing device may compare current location data from the obtained information from a source of location (e.g., current GPS coordinates from a GPS unit within the computing device, or from location information sources that do not use GPS, etc.) to determine whether the current request is still valid. For example, the computing device may poll location tracking software to determine whether the computing device has started moving away from a shopping mall in order to invalidate the current request for friends to meet the requestor at the mall. As another example, when the computing device is a server, the server may receive GPS coordinates of the requestor of the current request via the initial request message, and may compare those coordinates to the current request to determine current validity (e.g., is the requestor's current location still within the city in which he/she wished to have lunch with others?). When requests have location-related conditions, there may not be any time limit, but instead location tracking may be used by the computing device to validate or invalidate the current request.

It should be appreciated that any type or combination of information within requests and/or response messages, such as time-based conditions or response, may be evaluated by the computing device as part of the operations in determination block 492 to determine validity of the current request.

If the processor of the computing device determines that the current request is still valid (i.e., determination block 492="Yes"), the processor of the computing device may determine whether a response message is received in determination block 494. The operations in determination block 494 may be similar to those described above with reference to block 408. For example, the computing device may monitor an incoming message buffer to identify incoming PTT application messages from various recipient computing devices that received the invitation message. If the processor of the computing device determines that no response message has been received (i.e., determination block 494="No"), the processor may continue with the operations in block 491 for obtaining the information from the data sources. Optionally, the processor of the computing device may continue by transmitting redundant subsequent invitation messages in block 406.

If at least one response message is received (i.e., determination block 494="Yes"), in block 410, the processor of the computing device may evaluate the received response messages to determine whether the received response messages fulfill the current request. Based on the evaluations, in determination block 412, the processor of the computing device may determine whether the current request is completely fulfilled by received response messages. If it is determined that the current request is not completely fulfilled (or answered) by the received response messages (i.e., determination block 412="No"), in block 414, the processor of the computing device may generate a follow-up request corresponding to the unfulfilled (or unanswered) portions of the current request. In block 416, the processor of the computing device may set the current request as the follow-up request, such as by updating a system variable or other stored information indicating the current request. In optional block 418 the processor of the computing device may transmit a message to a user device indicating a partial fulfillment based on the received response messages. The computing device may then continue with the operations in block 406 to transmit subsequent (or updated) invitation messages that indicate the new current request.

If it is determined that the current request is completely fulfilled by the received response messages (i.e., determination block 412="Yes") or if it is determined that the current request is not still valid (i.e., determination block 492="No"), in block 420, the processor of the computing device may transmit to the plurality of computing devices a cancellation message that includes data instructing the devices to clean-up (e.g., remove) a display that solicits responses to the current request. In optional block 422, the processor of the computing device may automatically perform clean-up operations on local data to indicate the current request is completely fulfilled. In block 424, the processor of the computing device may transmit a message to a user device indicating the request is completely fulfilled based on the received response messages.

Figure 4E:
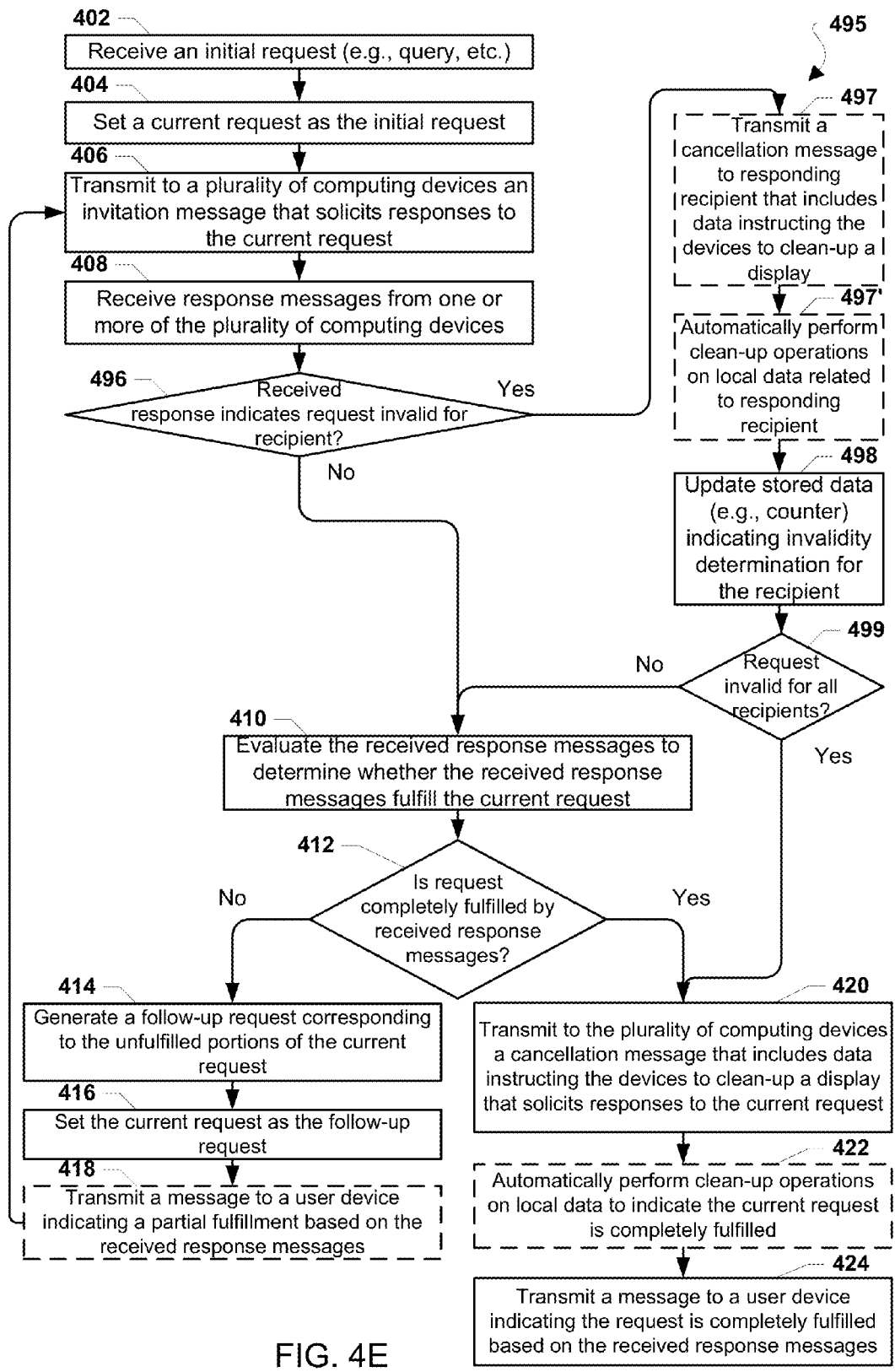

FIG. 4E illustrates an embodiment method 495 for a computing device to transmit invitation messages based on requests from a user to recipient computing devices in order to solicit responses (e.g., information, tasks, actions, etc.) desired by the user. The method 495 is similar to the method 400 described above, except that the method 495 may include operations for processing response messages from recipient computing devices that have individually determined that the current request is no longer valid for their respective recipient users. In response to receiving such indications of invalidity, the processor of the computing device (or server) may maintain data that indicates an accounting (e.g., a counter, an "activity history" or log, etc.) of those recipients that have determined the current request to be valid or invalid, and further may selectively transmit cancellation messages to such recipients to remove the request from their displays. The method 495 may be beneficial in enabling optional filtering and/or cleanup operations to be run at an individual recipient's choice.

As described above, in block 402, the processor of the computing device may receive an initial request. In block 404, the processor of the computing device may set a current request as the initial request. In block 406, the processor of the computing device may transmit to a plurality of computing devices (i.e., recipients computing devices) an invitation message that solicits responses to the current request. In block 408, the processor of the computing device may receive response messages from one or more of the plurality of computing devices.

In determination block 496, the processor of the computing device may determine whether the received response(s) indicate that the current request is invalid for recipient(s). The processor may evaluate the received response messages to identify any codes, symbols, text, spoken, or other information that indicates the recipient computing device that transmitted the response message has determined the current request is no longer valid for its respective recipient. For example, the response messages may include an "invalid" numeric code within metadata, or alternatively may be a text response that states "Your request or question is not related to me, sorry." Such response messages from recipient computing devices are described further below.

If the processor of the computing device determines that the received response indicates the current request is invalid for a recipient (i.e., determination block 496="Yes"), in optional block 497 the processor may transmit a cancellation message to the recipient computing device(s) (i.e., recipient) that transmitted the response message(s) indicating the current request was invalid and that includes data instructing the device(s) to clean-up a display. In other words, the computing device may transmit a message to instruct just the recipient computing device indicating that the current request is invalid to perform automatic clean-up operations. In optional block 497' the processor of the computing device may automatically perform clean-up operations on local data related to responding recipient, such as by updating a data field to indicate the recipient should no longer receive any communications regarding the current request. In block 498, the processor of the computing device may update stored data (e.g., a counter, an activity log, etc.) indicating the invalidity determination for the recipient that transmitted the response message. In determination block 499, the processor of the computing device may determine whether the current request is invalid for all the plurality of computing device that have received invitation messages related to the current request (i.e., the recipients) based on the stored data. For example, the processor may compare the value of a counter to the number of recipients to determine whether the current request is invalid for all recipients, and thus the current request should be invalidated completely. If the processor of the computing device determines that the current request is invalid for all the plurality of recipient computing devices (i.e., determination block 499="No"), the processor may continue with the operations in block 410.

In block 410, the processor of the computing device may evaluate the received response messages to determine whether the received response messages fulfill the current request. Based on the evaluations, in determination block 412, the processor of the computing device may determine whether the current request is completely fulfilled by received response messages. If processor determines that the current request is not completely fulfilled (or answered) by the received response messages (i.e., determination block 412="No"), the processor of the computing device may generate a follow-up request corresponding to the unfulfilled (or unanswered) portions of the current request in block 414. In block 416, the processor of the computing device may set the current request as the follow-up request, such as by updating a system variable or other stored information indicating the current request. In optional block 418, the processor of the computing device may transmit a message to a user device indicating a partial fulfillment based on the received response messages. The computing device may then continue with the operations in block 406 to transmit subsequent (or updated) invitation messages that indicate the new current request. If the processor determines that the current request is completely fulfilled by the received response messages (i.e., determination block 412="Yes"), or if the processor determines that the current request is invalid for all recipients (i.e., determination block 499="Yes"), in block 420, the processor of the computing device may transmit to the plurality of computing devices a cancellation message that includes data instructing the devices to clean-up (e.g., remove) a display that solicits responses to the current request. In optional block 422, the processor of the computing device may automatically perform clean-up operations on local data to indicate the current request is completely fulfilled. In block 424, the processor of the computing device may transmit a message to a user device indicating the request is completely fulfilled based on the received response messages.

In an embodiment, the computing device may determine to transmit cancellation messages when all (or a majority or a predefined plurality, etc.) of the recipients have individually determined the current request is invalid. For example, once a predetermined number or percentage of recipients have transmitted to the computing device that the current request is not valid, the computing device may perform local clean-up operations and/or transmit cancellation messages to trigger automatic clean-up operations at the various recipient computing devices.

Figure 5A:
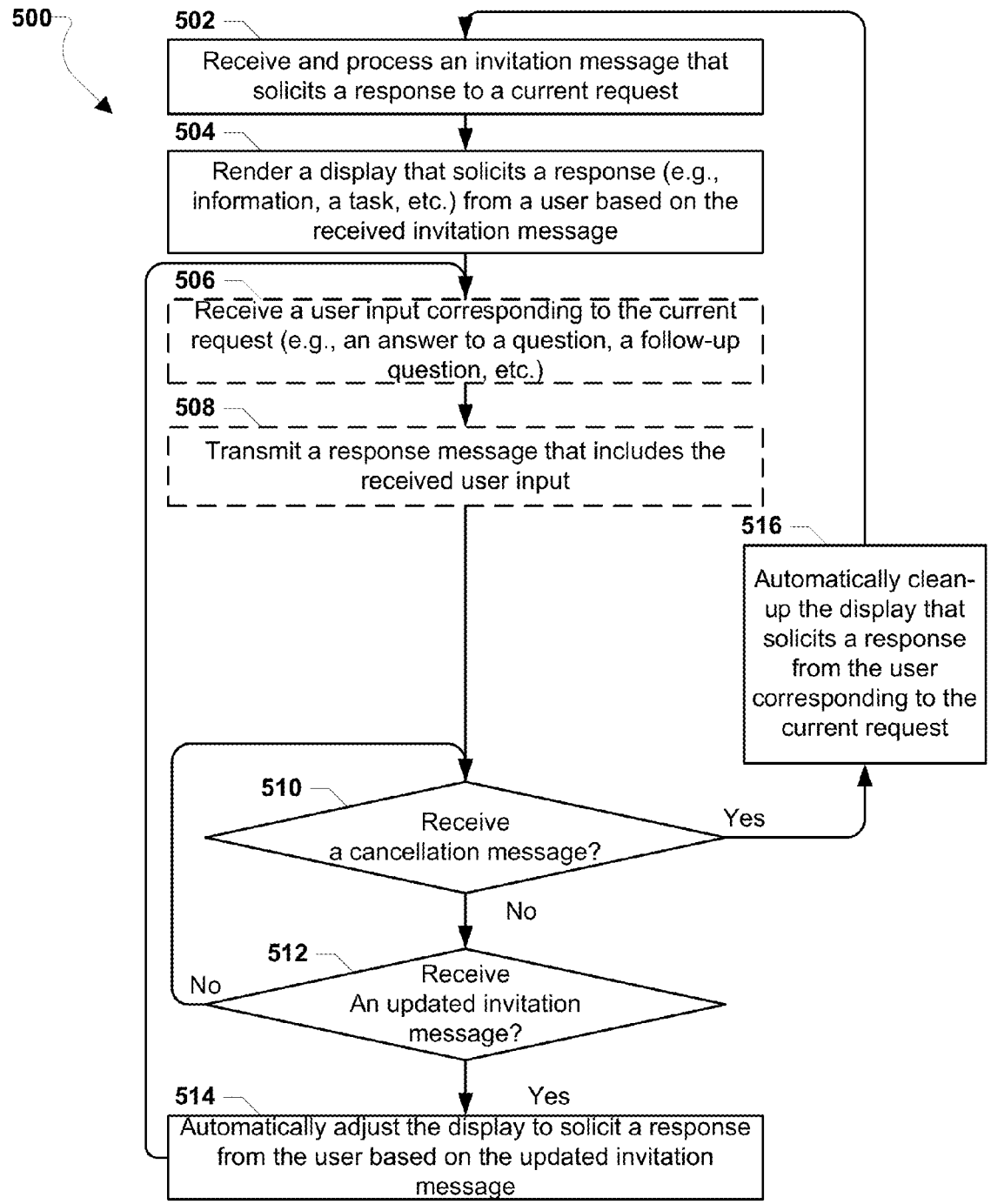
FIGS. 5A-5B are process flow diagrams illustrating embodiment methods for a computing device to render a display that solicits a response to a request based on a received invitation message.

FIG. 5A illustrates an embodiment method 500 for a recipient computing device to render a display that solicits a response to a request based on a received invitation message. For the purpose of simplicity, the following descriptions refer to a recipient computing device as performing the operations of the method 500. Further, the user of the recipient computing device is referred to as the "recipient". It should be appreciated that the recipient computing device may be any computing device, such as a mobile computing device (e.g., a smartphone utilized by a user). In various embodiments, any combination of the operations of the method 500 may be performed by one or more computing devices.

In block 502, the processor of the recipient computing device may receive and process an invitation message that solicits a response to a current request. For example, the recipient computing device may receive the invitation message directly from another user's computing device (e.g., via P2P communications, LAN, Bluetooth signals, WiFi Direct, etc.) or from a PTT communication service server via a WAN (e.g., over a cellular network connection, etc.). The recipient computing device may perform various parsing, decoding, and analysis operations on the received invitation message to identify the characteristics and particulars of the current request. For example, the recipient computing device may evaluate text information, special bits, symbols, scripts, or codes within the received invitation message to identify the sender's identity, any included question(s), the preferred response mode (or format) for responses, tasks requested, timestamp information, freshness or time-to-live (TTL) data, etc.

In block 504, the processor of the recipient computing device may render a display that solicits the response (e.g., information, a task, etc.) from a user based on the received invitation message. For example, the recipient computing device may render a dialog box within a PTT application or other graphical display such as described above with reference to FIGS. 3A-3C. The display may include representations of the response types or response message formats preferred by the sender of the invitation message (i.e., the preferred response mode), such as text queries/questions, audio samples of spoken instructions for a task, pictures, diagrams, or other information that may indicate the purpose and objectives of the current request. Such preferred response mode information may be based on preference information indicated in the received invitation message, and further may be dynamically adjusted with the receipt of subsequent invitation messages related to the request. For example, the display for a first request may initially indicate a text response is requested, however in response to receiving an updated invitation message, the recipient computing device may render the display to indicate only PTT application messages may be transmitted to respond to the request.

In an embodiment, the rendered display may be a list of all active requests received by the recipient computing device. For example, the rendered display may be a list of messages from various users at various times, each indicating a question to be answered by the recipient using the recipient computing device. In an embodiment, the display may include dynamic indicators, such as graphical elements (e.g., flags, numbers, colors, etc.), that indicate the priority, status, and/or preferred response mode for the current request. For example, the rendered display on the recipient computing device may include a flashing graphical element when the current request is still active (i.e., not completely fulfilled by responses).

In optional block 506, the processor of the recipient computing device may receive a user input corresponding to the current request. The user input may fulfill all or a portion of the current request. For example, the recipient computing device may receive from user inputs text data that provides the correct answer to the query posed by the current request from the invitation message (e.g., an answer of "No" to the current request of "Is anyone in the office today?"). The user input may be an answer, a statement, or a question. For example, the user input may be a response that indicates the recipient is not able to properly respond to the current request for information. As another example, the user input may be voice data that includes a follow-up question from the recipient (e.g., "I can't answer your question as stated. Are you talking about Office A or Office B?"). The operations in optional block 506 may not be performed when the recipient does not see the rendered display or otherwise chooses not to participate in the current request.

In optional block 508, the processor of the recipient computing device may transmit a response message that includes the received user input. The response message may be transmitted in a format or using a communication method described within the received invitation message. For example, the recipient computing device may transmit the response message to an IP address, phone number, or other destination indicated within metadata of the received invitation message. In an embodiment, the response message may be transmitted to a server or directly to a computing device used by the user who sent the invitation message.

In determination block 510, the processor of the recipient computing device may determine whether a cancellation message is received. For example, the recipient computing device may monitor an incoming message buffer to detect when messages are received that include header information corresponding to cancellation messages for the current request. The recipient computing device may evaluate codes within various received message to determine whether received messages are associated with the current request, such as by comparing unique request identifiers indicated within metadata of messages formatted for a PTT application. Alternatively, the recipient computing device may analyze all incoming messages, such as all messages associated with a PTT application, to determine whether these messages include data, codes, or other information that indicate the messages are cancellation messages. If it is determined that the cancellation message is received (i.e., determination block 510="Yes"), in block 516, the processor of the recipient computing device may automatically cleanup (or remove) the display that solicits a response from the user corresponding to the current request of the received invitation message. For example, the recipient computing device may delete the display by removing a database entry associated with the current request and re-render (or fresh) a PTT application so that the current request is no longer presented to the user of the recipient computing device. In various embodiments, the recipient computing device may adjust data associated with the current request in order to hide the display or otherwise configure the display to be invisible with respect to the current request. For example, the recipient computing device may configure a presentation to not include a representation of a question of the current request, but may still retain the question in a stored list of received and fulfilled requests. In an embodiment, the recipient computing device may adjust the display or otherwise render information indicating that the current request has been satisfied or has a changed priority, rank, status, or importance. For example, the display may include a colorcode, checkbox, labels (e.g., "Fulfilled!", "Already answered," "Awaiting a response to your follow-up question," etc.) or other indicia that indicate the current request is no longer active.

If it is determined that the cancellation message is not received (i.e., determination block 510="No"), in determination block 512 the processor of the recipient computing device may determine whether an updated invitation message is received. For example, the recipient computing device may monitor an incoming message buffer to detect whether subsequent invitation messages (with follow-up requests) have been received that correspond to the current request. If it is determined that the updated invitation message is not received (i.e., determination block 512="No"), the recipient computing device may continue to monitor for subsequent messages by performing the operations in determination block 510. However, if it is determined that the updated invitation message is received (i.e., determination block 512="Yes"), in block 514 the processor of the recipient computing device may automatically adjust the display to solicit a response from the user based on the updated invitation message. For example, the recipient computing device may change a rendered question of the current request to include clarifying language or additional questions received via the updated invitation message in order to solicit another response. The recipient computing device may continue with the operations to receive user inputs for another response in optional block 506.

Figure 5B:
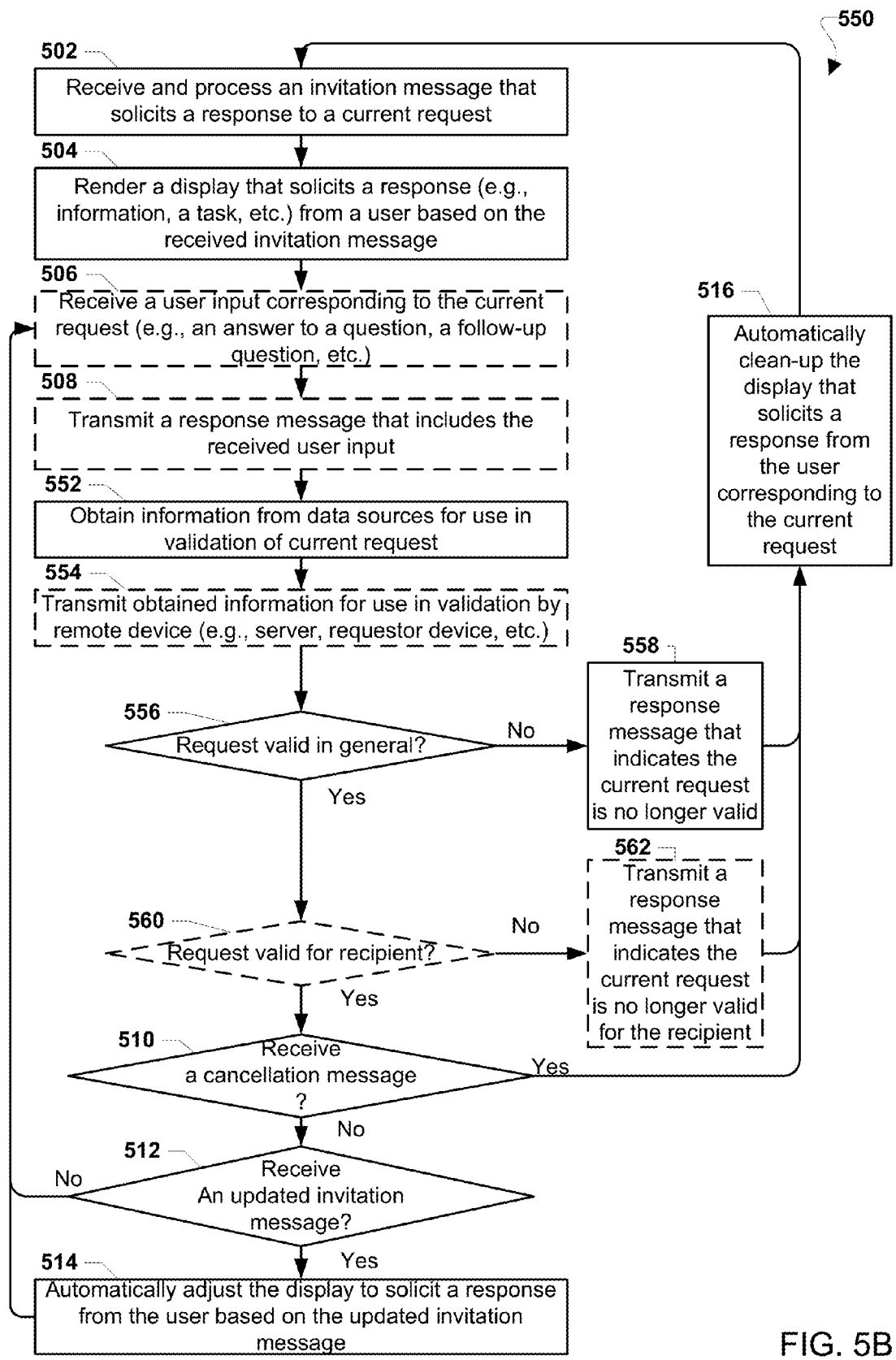

FIG. 5B illustrates an embodiment method 550 for a recipient computing device to render a display that solicits a response to a request based on a received invitation message. The method 550 is similar to the method 500 described above, except that the method 550 includes operations for the recipient computing device to determine whether a current request is still valid based on information related to the recipient computing device. In particular, the recipient computing device may be configured to perform automatic clean-up operations in response to performing various validation operations using time-based information (e.g., a current time, date, etc. from a time measurement unit), location-based information obtained from a source of location information (e.g., GPS coordinates of the recipient computing device obtained from a GPS unit, a location information source or service that does not use GPS, etc.), and relevancy-based information (e.g., is the recipient on-the-clock or on vacation, etc.). Such validation operations of the recipient computing device may be similar to operations of the computing device in determination block 492 described above with reference to FIG. 4D.

For the purpose of simplicity, the following descriptions refer to a processor of a recipient computing device as performing the operations of the method 550. Further, the user of the recipient computing device is referred to as the "recipient". It should be appreciated that the recipient computing device may be any computing device, such as a mobile computing device (e.g., a smartphone utilized by a user). In various embodiments, any combination of the operations of the method 550 may be performed by one or more computing devices.

As described above, in block 502, the processor of the recipient computing device may receive and process an invitation message that solicits a response to a current request. In block 504, the processor of the recipient computing device may render a display that solicits the response (e.g., information, a task, etc.) from a user based on the received invitation message. In optional block 506, the processor of the recipient computing device may receive a user input corresponding to the current request. In optional block 508, the processor of the recipient computing device may transmit a response message that includes the received user input.

In block 552, the processor of the recipient computing device may obtain information from data sources for use in validation of the current request, such as from a time measurement unit, a source of location information (e.g., a GPS unit or other source or service that provides location information), a local information database, and/or an Internet resource. For example, the recipient computing device may access locally stored data (e.g., an address book, an email client, stored text messages, social networking profile data, etc.) and/or perform operations to retrieve data from various websites via the Internet. The information may be obtained based on processing the content of the current request and/or invitation message, such as by performing natural language processing routines on an email or SMS text message to determine the meaning of a question, statement, or other information for the current request. For example, when the received invitation message asks "Who will be in the office at noon?", the recipient computing device may obtain the current time from a time measurement unit (e.g., a system clock, etc.) to determine whether the request is still valid based on the current time. As another example, when the current request asks "who can help me get into my office right now?," the recipient computing device may access current GPS coordinates from a GPS unit and/or access calendar data stored locally to obtain information indicating whether the recipient of the recipient computing device is within the office to be eligible to help the requestor.

In optional block 554, the processor of the recipient computing device may transmit the obtained information for use in validation by a remote device (e.g., server, requestor device, etc.). For example, location information (or other presence information) may be transmitted to a server computing device for processing to determine whether the current request is still valid.

In determination block 556, the processor of the recipient computing device may determine whether the current request is valid in general based on the obtained information. In other words, the recipient computing device may evaluate the obtained information and the current request to determine whether the current request is moot or otherwise incapable of being properly fulfilled or answered by the recipient computing device or any other device that may have received an invitation message with the current request. For example, the recipient computing device may determine whether the current time (e.g., 4 PM) renders the current request for time-dependent assistance pointless (e.g., "Who wants to get lunch?"). If the processor determines that the request is not valid in general (i.e., determination block 556="No"), in block 558 the processor of the recipient computing device may transmit a response message that indicates the current request is no longer valid (e.g., transmit a response message to a requestor computing device and/or a server), automatically clean-up the display that solicits a response from the user corresponding to the current request in block 516, and continue with the operations in block 502 for receiving and processing other invitation messages. The response message transmitted with the operations in block 558 may be received by a computing device (e.g., a server, etc.) and processed to transmit cancellation messages that inform other devices that have received the invitation message that the current request is no longer valid.

However, if the processor determines that the request is still valid in general (i.e., determination block 556="Yes"), the processor of the recipient computing device may determine whether the current request is valid for the recipient based on the obtained information in optional determination block 560. In other words, the recipient computing device may evaluate the current request to determine whether the request may still be possibly answered or fulfilled by some person, but not by the recipient. For example, the recipient computing device may compare its current GPS coordinates to a known office building to determine whether the recipient is within the office building and thus eligible to help fulfill the current request to help the requestor get into his office space. As another example, the recipient computing device may compare locally stored calendar information indicating the recipient is within a meeting for the next several hours to determine the recipient cannot fulfill the current request of going to the market in the next five minutes. In an embodiment, the determination in determination block 556 may be based on user input, such as a user-supplied button press to indicate he or she is not interested in being involved in the current request (or receiving further related notifications).

If the processor determines that the request is not valid for the recipient (i.e., optional determination block 560="No"), in optional block 562 the processor of the recipient computing device may transmit a response message that indicates the current request is no longer valid for the recipient, such as by transmitting a response message to a request computing device and/or a server. The processor of the recipient computing device may automatically clean-up the display that solicits a response from the user corresponding to the current request in block 516, and continue with the operations in block 502 for receiving and processing other invitation messages.

However, if the processor determines that the request is still valid for the recipient (i.e., optional determination block 560="Yes"), the processor of the recipient computing device may determine whether a cancellation message is received in determination block 510. If the processor determines that the cancellation message is received (i.e., determination block 510="Yes"), in block 516, the processor of the recipient computing device may automatically clean-up (or remove) the display that solicits a response from the user corresponding to the current request of the received invitation message.

If the processor determines that the cancellation message is not received (i.e., determination block 510="No"), the processor of the recipient computing device may determine whether an updated invitation message is received in determination block 512. If the processor determines that the updated invitation message is not received (i.e., determination block 512="No"), the processor of the recipient computing device may continue to monitor for subsequent messages by performing the operations in determination block 510. However, if the processor that the updated invitation message is received (i.e., determination block 512="Yes"), in block 514 the processor of the recipient computing device may automatically adjust the display to solicit a response from the user based on the updated invitation message. The processor of the recipient computing device may continue with the operations to receive user inputs for another response in optional block 506.

Figure 6A:
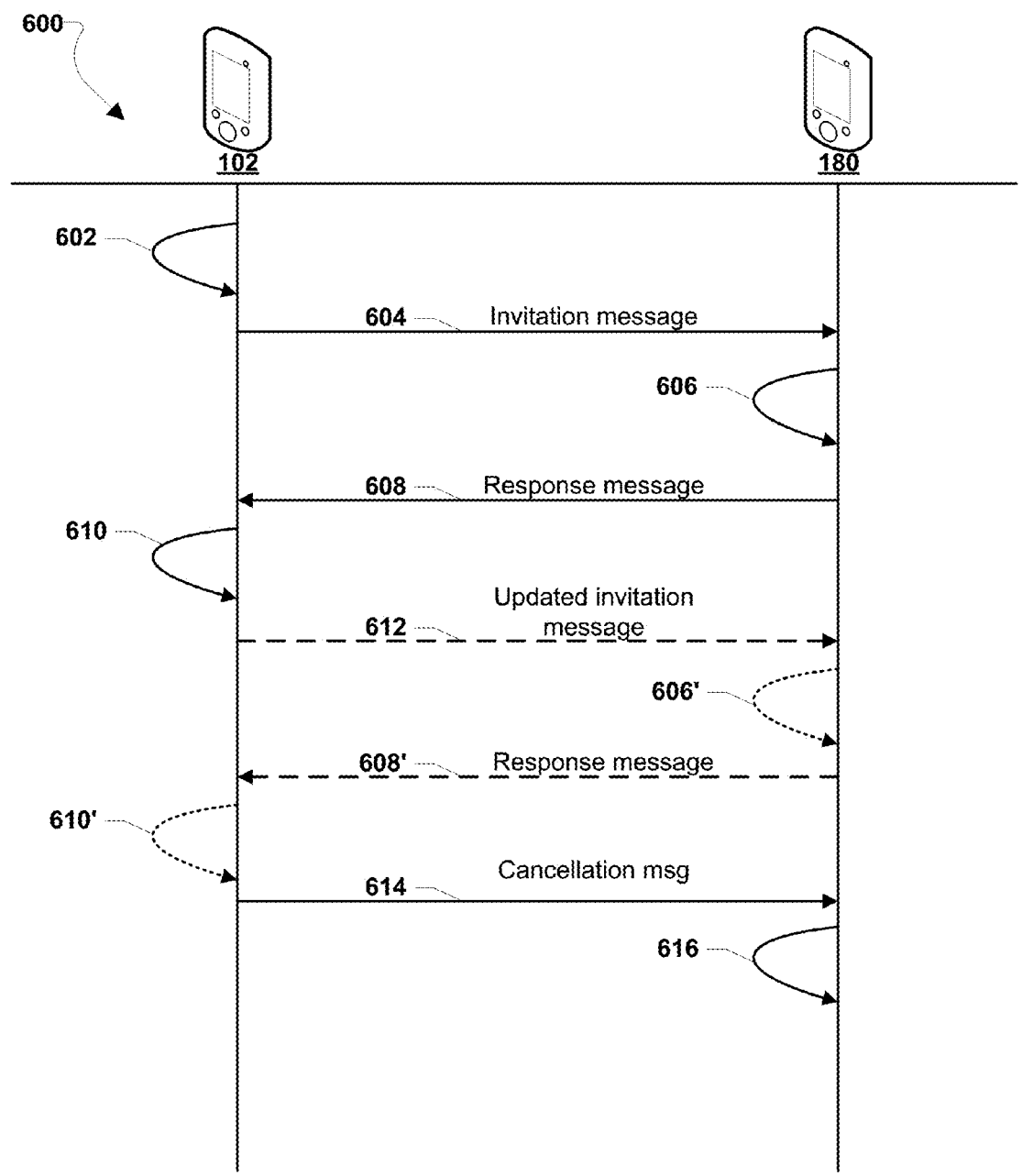
FIG. 6A is a call flow diagram illustrating various communications between a user computing device and a recipient computing device that correspond to a request from a user according to an embodiment.

FIG. 6A is a diagram 600 illustrating exemplary communications between a user computing device 102 and a recipient computing device 180 that correspond to a request from a user. The various communications illustrated in diagram 600 may be considered direct communications or signaling between the user computing device 102 and the recipient computing device 180. For example, the devices 102, 180 may be configured to exchange P2P communications via short-range signaling (e.g., Bluetooth, WiFi Direct, etc.) or over a LAN (e.g., data transmitted via a WiFi router). Further, the various communications may be proprietary messaging corresponding to an application executing on both devices 102, 180, SMS/MMS text messages, PTT communications, and/or any combination of messaging techniques or formats supported by the devices 102, 180.

The user computing device 102 may perform operations 602 to identify a current request, such as by receiving text data representing a question or requesting an action be performed by others and/or receiving inputs that indicate desired recipients for the current request (e.g., touch inputs on graphical elements of contacts within an address book of a PTT application, etc.). The user computing device 102 may perform operations to transmit an invitation message 604 to the recipient computing device 180 based on the current request. The recipient computing device 180 may perform operations 606 to process and render the current request indicated in the received invitation message 604 as well as receive response inputs from the recipient user. The recipient computing device 180 may transmit a response message 608 to the user computing device 102, such as a text or audio message indicating an answer, question, or other information corresponding to a question posed within the invitation message 604.

The user computing device 102 may perform operations 610 to process the response message 608, such as by performing text analysis, speech-to-text processing, or other routines to identify content within the response message 608 in relation to the current query. In an embodiment, the user computing device 102 may perform operations to remove or otherwise clean-up data corresponding to the current request, such as by removing or altering locally stored database information to indicate the current request is fulfilled by the response message 608.

When the current request is determined to not be fulfilled (e.g., an outstanding question is inadequately answered by information from the response message 608), the user computing device 102 may transmit an optional updated invitation message 612, and the recipient computing device may perform optional operations 606' to process and render the information in the optional updated invitation message 612 as well as receive response inputs from the recipient user. The recipient computing device 180 may transmit an optional response message 608' to the user computing device 102. The user computing device 102 may perform optional operations 610' to process the optional response message 608'.

When the current request is determined to be fulfilled (e.g., an outstanding question is adequately answered with information from the response message 608 or the optional response message 608'), the user computing device 102 may transmit a cancellation message 614 to the recipient computing device 180. The recipient computing device 180 may perform operations 616 to process the cancellation message 614, such as by performing automatic clean-up operations that remove, hide, or otherwise adjust locally stored information related to the current request and/or the invitation message 604. For example, the operations 616 may include executing a routine to delete a database entry associated with the current request or alternatively to set a variable within the database entry that controls whether data from the entry may be presented by a PTT application.

Figure 6B:
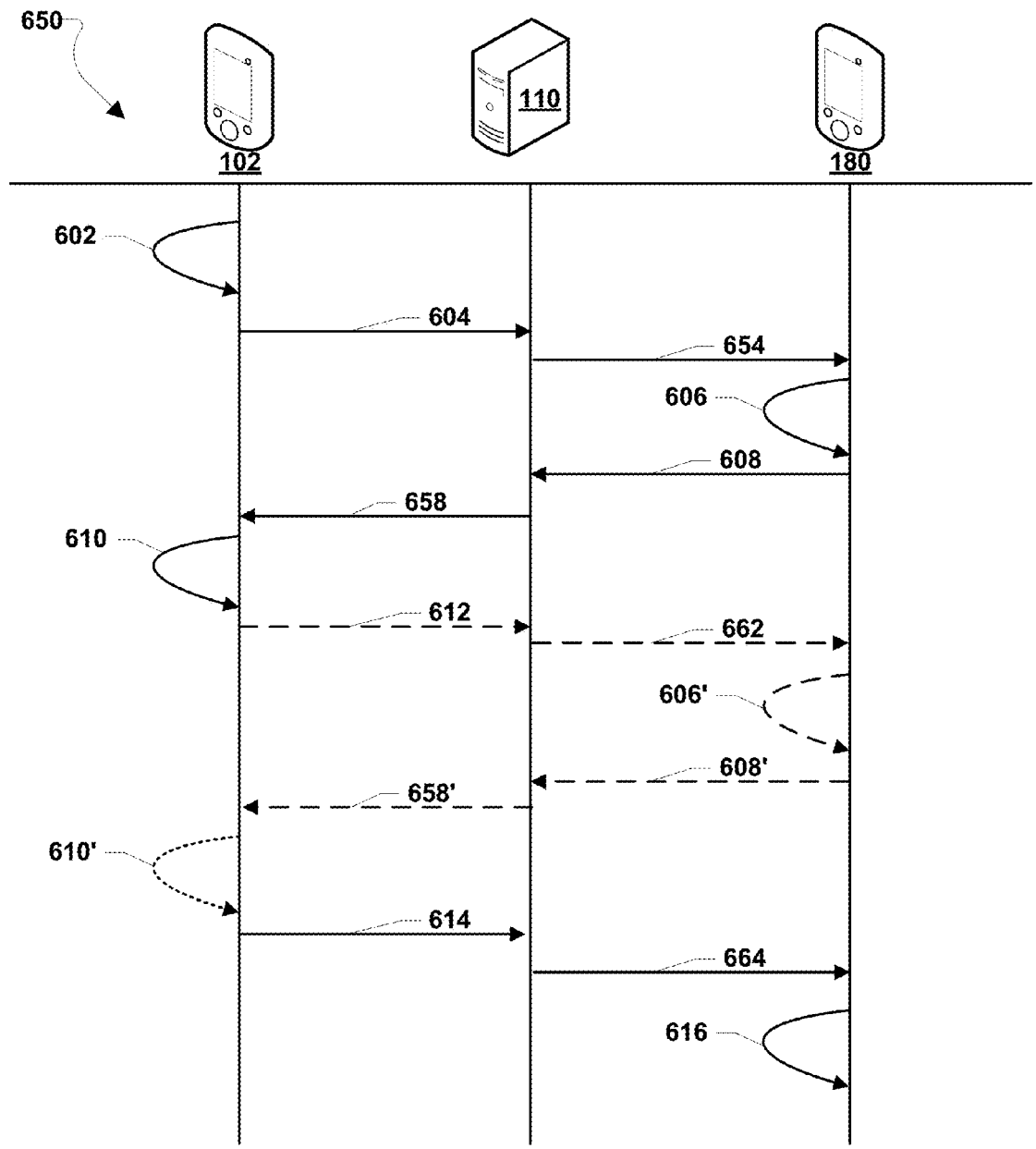
FIGS. 6B-6C are call flow diagrams illustrating various communications between a user computing device, a recipient computing device, and a server computing device that correspond to a request from a user according to an embodiment.
Figure 6C:
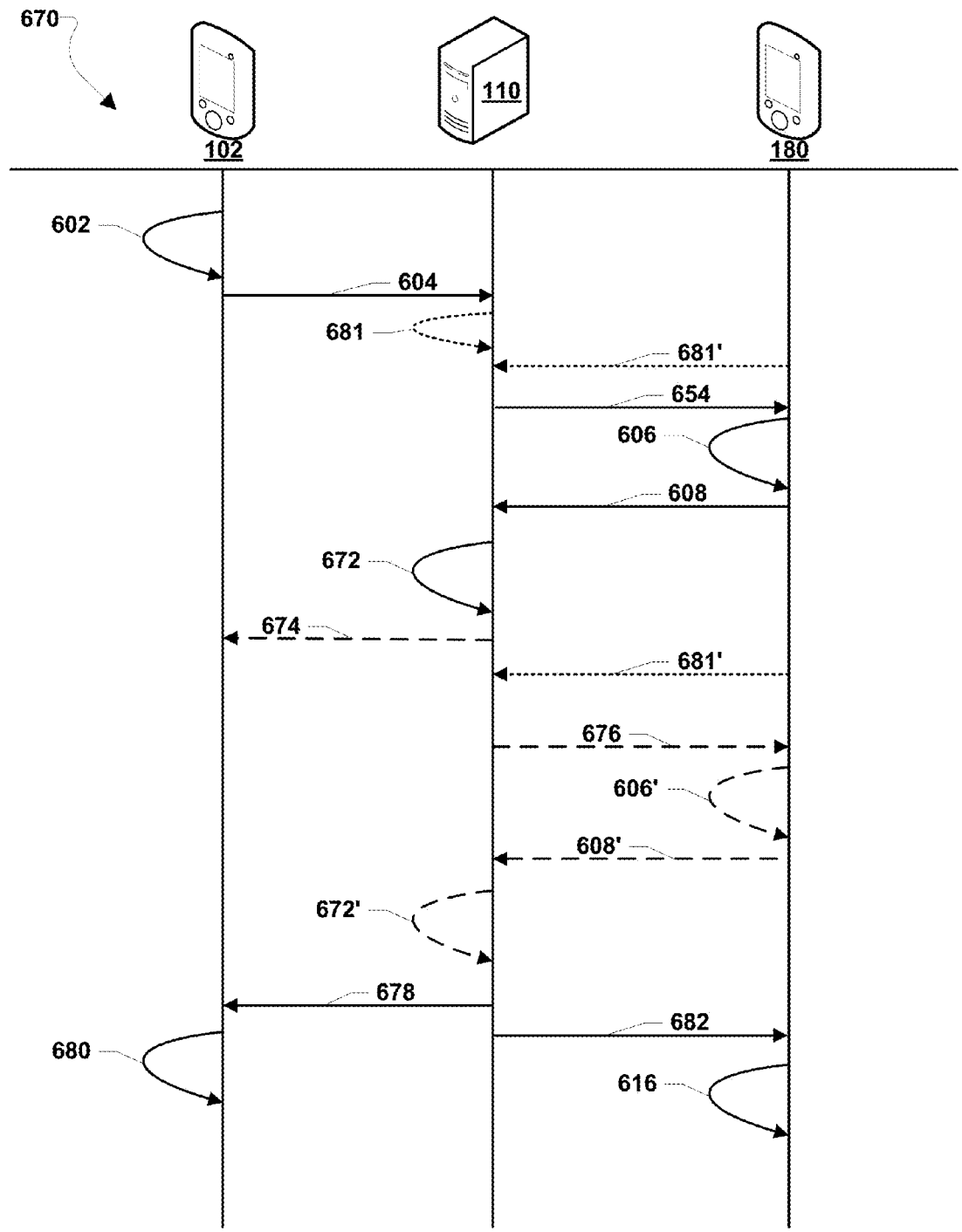

FIGS. 6B-6C are diagrams 650, 670 illustrating exemplary communications between a user computing device 102, a recipient computing device 180, and a server computing device 110 that correspond to a request from a user. The diagrams 650, 670 are similar to the diagram 600 described above with reference to FIG. 6A, except that instead of the user computing device 102 and recipient computing device 180 directly communicating with each other, messaging is routed through a server computing device 110. For example, the server computing device 110 may be a device configured to facilitate communications associated with a PTT application executing on both the user computing device 102 and the recipient computing device 180. The various communications exchanged between the server computing device 110 and the devices 102, 180 may be transmitted over a WAN (e.g., a cellular network, the Internet, etc.) and/or a LAN (e.g., a LAN within a building enabled by a WiFi router). For example, the user computing device 102 may communicate with the server computing device 110 over a WiFi connection and the recipient computing device 180 may exchange messages with the server computing device 110 over the Internet, or vice versa. Further, the server computing device 110 may be configured to receive and transmit different types of formats of messages. For example, the server computing device 110 may be configured to exchange PTT messages associated with a PTT application with the user computing device 102 and exchange SMS/MMS text messages or emails with the recipient computing device 180, or vice versa.

FIG. 6B illustrates a scenario in which the server computing device 110 is merely a router for messaging between the user computing device 102 and the recipient computing device 180. In particular, the user computing device 102 may perform operations 602 to identify a current request and transmit an invitation message 604 to the server computing device 110 based on the current request. The server computing device 110 may transmit a relayed invitation message 654 to the recipient computing device 180. The relayed invitation message 654 may be identical to the invitation message 604, or alternatively may be formatted in a different message format suitable for use by the recipient computing device 180. The recipient computing device 180 may perform operations 606 to process and render the current request indicated in the relayed invitation message 654 as well as receive response inputs from the recipient user. The recipient computing device 180 may transmit a response message 608 to the server computing device 110, which may transmit a relayed response message 658 to the user computing device 102. The relayed response message 658 may be identical to the response message 608, or alternatively may be formatted in a different message format suitable for use by the user computing device 102.

The user computing device 102 may perform operations 610 to process the relayed response message 658, such as by performing text analysis, speech-to-text processing, or other routines to identify content within the relayed response message 658 in relation to the current query. When the current request is determined to not be fulfilled (e.g., an outstanding question is inadequately answered by information from the relayed response message 658), the user computing device 102 may transmit an optional updated invitation message 612 to the server computing device 110, which may be transmitted to the recipient computing device 180 as an optional relayed updated invitation message 662. The recipient computing device may perform optional operations 606' to process and render the information in the optional relayed updated invitation message 662 as well as receive response inputs from the recipient user. The recipient computing device 180 may transmit an optional response message 608' to the server computing device 110, which may in turn transmit an optional relayed response message 658' to the user computing device 102. The user computing device 102 may perform optional operations 610' to process the optional relayed response message 658'.

When the current request is determined to be fulfilled (e.g., an outstanding question is adequately answered with information from the response message 608 or the optional relayed response message 658'), the user computing device 102 may transmit a cancellation message 614 to the server computing device 110, which may transmit a relayed cancellation message 664 to the recipient computing device 180. The relayed cancellation message 664 may be identical to the cancellation message 614, or alternatively may be formatted in a different message format suitable for use by the recipient computing device 180. The recipient computing device 180 may perform operations 616 to process the relayed cancellation message 664, such as by performing automatic clean-up operations that remove, hide, or otherwise adjust locally stored information related to the current request and/or the relayed invitation message 654.

FIG. 6C illustrates a scenario in which the server computing device 110 evaluates response messages to determine whether a user's request is fulfilled. Unlike as described above with reference to FIG. 6B, in diagram 670 the server computing device 110 may be configured to processes various communications in order to determine whether requests are fulfilled and thus may be cleaned-up in the user computing device 102 and/or the recipient computing device 180.

In particular, the user computing device 102 may perform operations 602 to identify a current request and transmit an invitation message 604 to the server computing device 110 based on the current request. The server computing device 110 may transmit a relayed invitation message 654 to the recipient computing device 180. The relayed invitation message 654 may be identical to the invitation message 604, or alternatively may be formatted in a different message format suitable for use by the recipient computing device 180. The recipient computing device 180 may perform operations 606 to process and render the current request indicated in the relayed invitation message 654 as well as receive response inputs from the recipient user. The recipient computing device 180 may transmit a response message 608 to the server computing device 110, which may perform operations 672 to process the response message 608, such as by performing text analysis, speech-to-text processing, or other routines to identify content within the response message 608. The operations 672 may be similar to the operations 610 performed by the user computing device 102 as described above.

In an embodiment, the server computing device 110 may be configured to push the initial request via a relayed invitation message 654 at time of the initial request or alternatively may perform optional operations 681 to store the information of the initial request for a duration. In response to receiving an optional retrieval request message 681' from the recipient computing device 180, the server computing device 110 may transmit the relayed invitation message 654 and/or optional updated invitation messages 676. This may enable the recipient computing device 180 to retrieve outstanding initial requests (or updates) on demand from a storage location such as the server computing device 110.

When the current request is determined to not be fulfilled (e.g., an outstanding question is inadequately answered by information from the response message 608), the server computing device 110 may transmit an optional message 674 to the user computing device 102 indicating any partial responses (or partial answers) to the current request that were identified from the response message 608. The server computing device 110 may also generate and transmit an optional updated invitation message 676 to the recipient computing device 180. The recipient computing device may perform optional operations 606' to process and render the information in the optional updated invitation message 676 as well as receive response inputs from the recipient user. The recipient computing device 180 may transmit an optional response message 608' to the server computing device 110, which may in turn perform optional operations 672' to process the optional response message 608'.

When the current request is determined to be fulfilled (e.g., an outstanding question is adequately answered with information from the response message 608 or the optional response message 608'), the server computing device 110 may transmit a message 678 to the user computing device 102 indicating the current request has been completely fulfilled. The user computing device 102 may perform operations 680 to process the message 678, such as by performing clean-up operations on a local database, or displaying a completion message to a user. The server computing device 110 may also transmit a cancellation message 682 to the recipient computing device 180. The recipient computing device 180 may perform operations 616 to process the cancellation message 682, such as by performing automatic clean-up operations that remove, hide, or otherwise adjust locally stored information related to the current request and/or the relayed invitation message 654.

Figure 7:
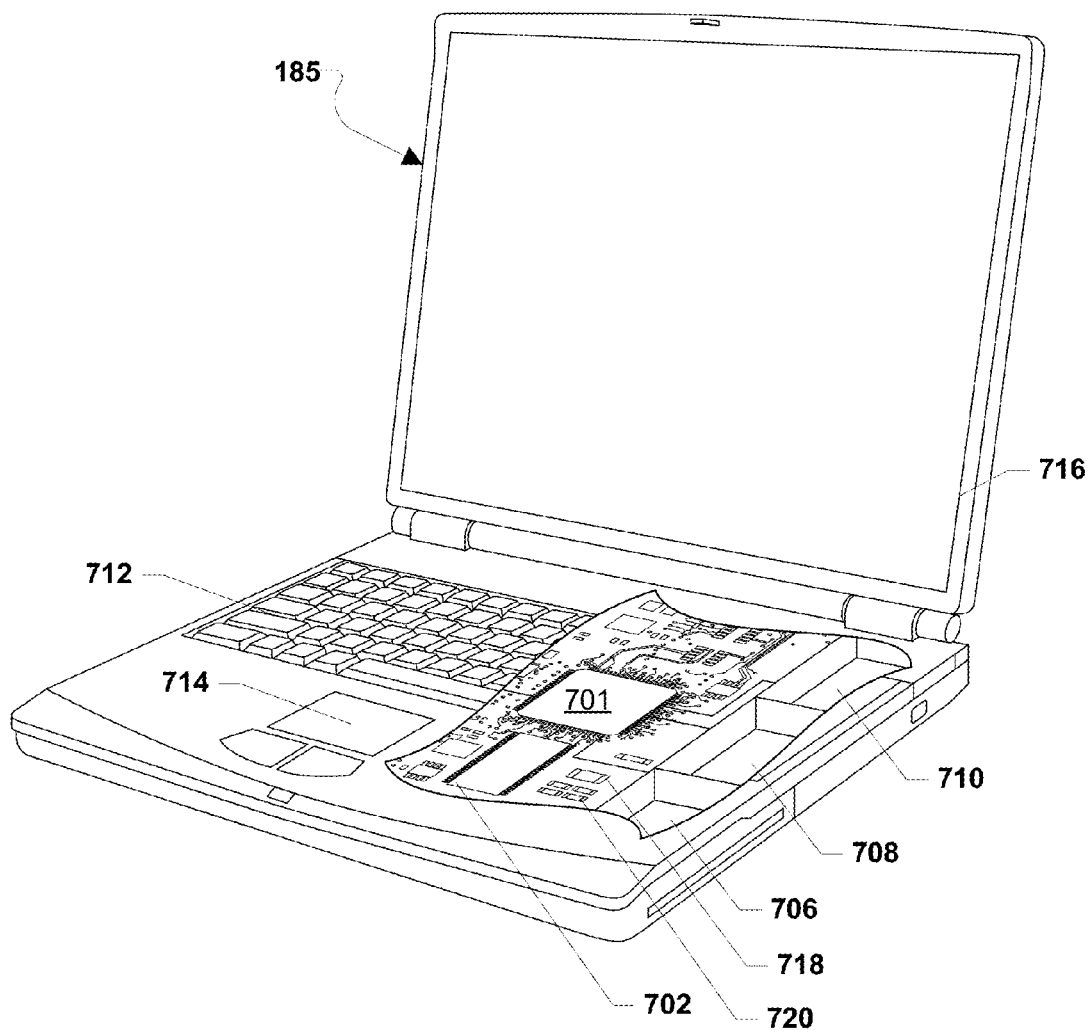
FIG. 7 is a component block diagram of an example laptop computing device suitable for use with the various embodiments.

Other forms of computing devices, including personal computers and laptop computers, may be used to implementing the various embodiments. Such computing devices typically include the components illustrated in FIG. 7 which illustrates an example laptop computing device 185. Many laptop computers include a touch pad touch surface 714 that serves as the computer's pointing device, and thus may receive drag, scroll, and flick gestures similar to those implemented on mobile computing devices equipped with a touch screen display and described above. Such a laptop computing device 185 generally includes a processor 701 coupled to volatile internal memory 702 and a large capacity nonvolatile memory, such as a disk drive 706. The laptop computing device 185 may also include a compact disc (CD) and/or DVD drive 708 coupled to the processor 701. The laptop computing device 185 may also include a number of connector ports 710 coupled to the processor 701 for establishing data connections or receiving external memory devices, such as a network connection circuit for coupling the processor 701 to a network. The laptop computing device 185 may have one or more short-range radio signal transceivers 718 (e.g., Peanut®, Bluetooth®, Zigbee®, RF radio) and antennas 720 for sending and receiving wireless signals as described herein. The transceivers 718 and antennas 720 may be used with the above-mentioned circuitry to implement the various wireless transmission protocol stacks/interfaces. In a laptop or notebook configuration, the computer housing may include the touch pad 714, the keyboard 712, and the display 716 all coupled to the processor 701. Other configurations of the laptop computing device 185 may include a computer mouse or trackball coupled to the processor 701 (e.g., via a USB input) as are well known, which may also be used in conjunction with the various embodiments.

Figure 8:
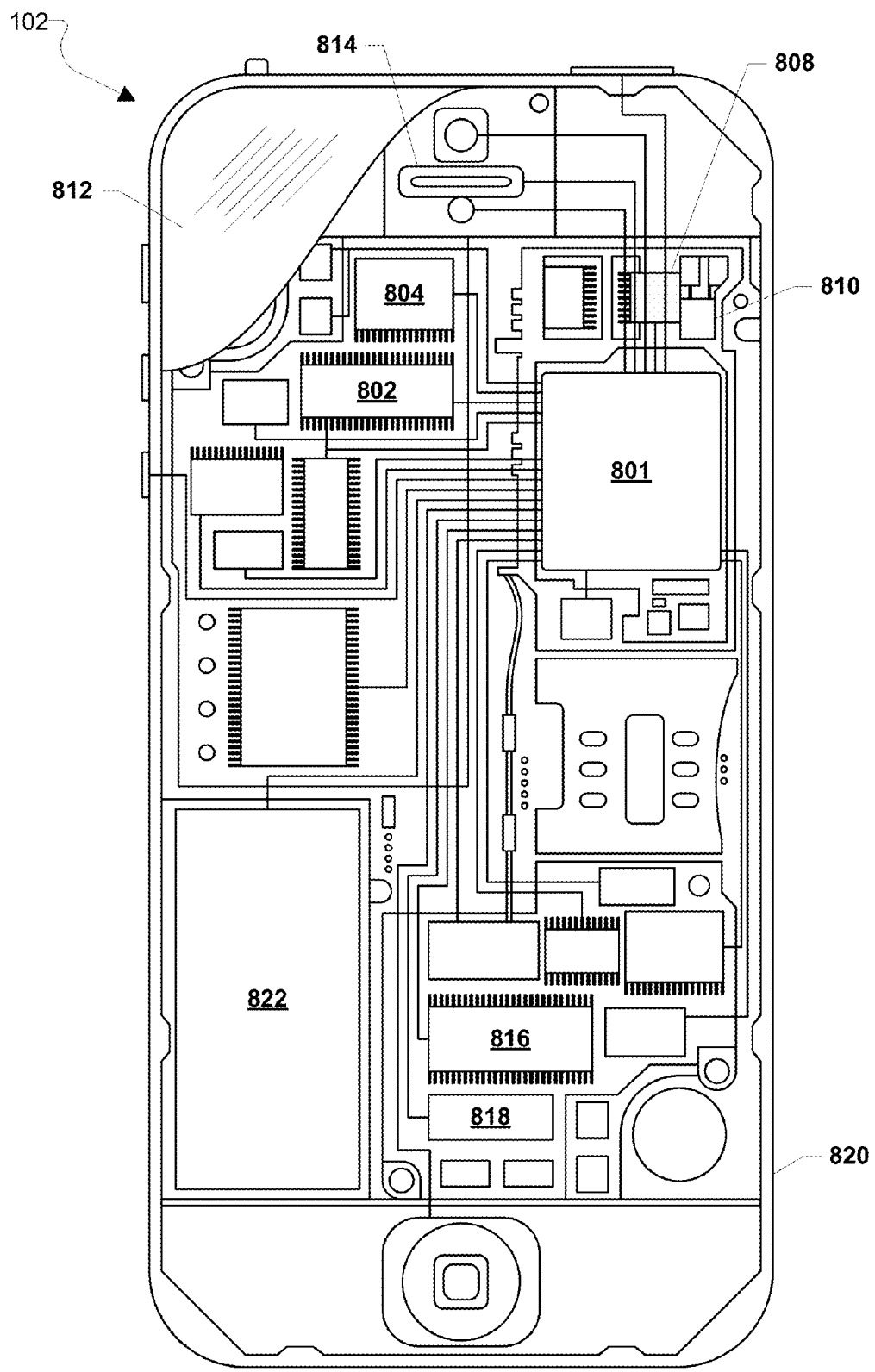
FIG. 8 is a component block diagram of a mobile computing device suitable for use in an embodiment.

FIG. 8 illustrates an embodiment multicore device 800. In various embodiments, the multicore device 800 may include a processor 801 coupled to a touchscreen controller 804 and an internal memory 802. The processor 801 may be one or more multicore ICs designated for general or specific processing tasks. The internal memory 802 may be volatile or non-volatile memory, and may also be secure and/or encrypted memory, or unsecure and/or unencrypted memory, or any combination thereof. The touchscreen controller 804 and the processor 801 may also be coupled to a screen 812, such as a resistive-sensing touchscreen, capacitive-sensing touchscreen, infrared sensing touchscreen, etc. The multicore device 800 may have one or more radio signal transceivers 808 (e.g., Peanut®, Bluetooth®, Zigbee®, Wi-Fi, RF radio) and antennae 810, for sending and receiving, coupled to each other and/or to the processor 801. The transceivers 808 and antennae 810 may be used with the above-mentioned circuitry to implement the various wireless transmission protocol stacks and interfaces. The multicore device 800 may include a cellular network wireless modem chip 816 that enables communication via a cellular network and is coupled to the processor. The multicore device 800 may include a peripheral device connection interface 818 coupled to the processor 801. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The multicore device 800 may also include speakers 814 for providing audio outputs. The multicore device 800 may also include a housing 820, constructed of a plastic, metal, or a combination of materials, for containing all or some of the components discussed herein. The multicore device 800 may include a power source 822 coupled to the processor 801, such as a disposable or rechargeable battery. The rechargeable battery may also be coupled to the peripheral device connection port to receive a charging current from a source external to the multicore device 800.

Figure 9:
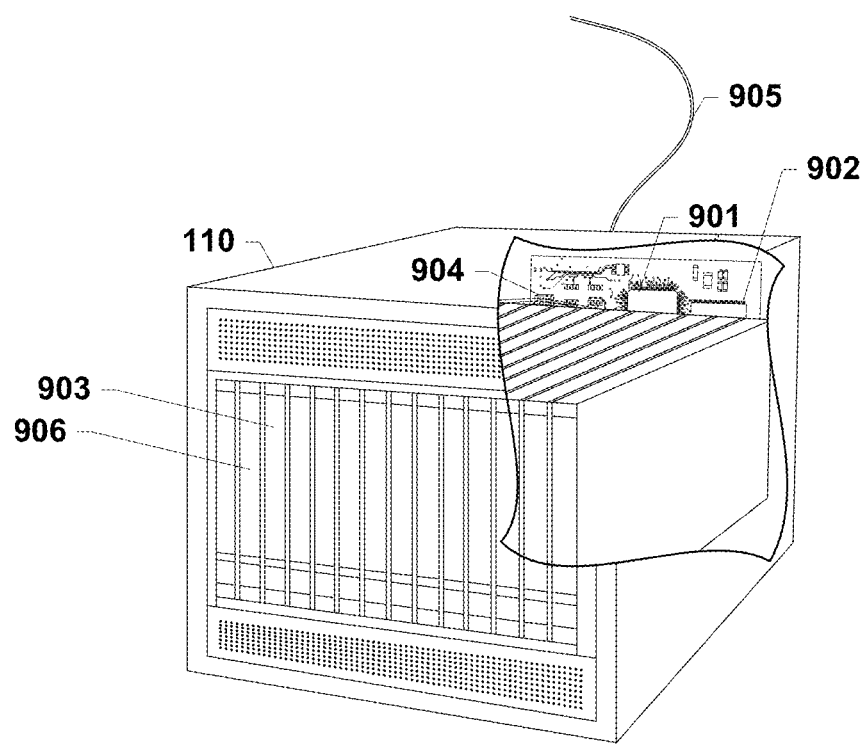
FIG. 9 is a component block diagram of a server computing device suitable for use in an embodiment.

The various embodiments may be implemented on any of a variety of commercially available server devices, such as the server computing device 110 illustrated in FIG. 9. Such a server computing device 110 typically includes a processor 901 coupled to volatile memory 902 and a large capacity nonvolatile memory, such as a disk drive 903. The server computing device 110 may also include a floppy disc drive, compact disc (CD) or DVD disc drive 906 coupled to the processor 901. The server computing device 110 may also include network access ports 904 coupled to the processor 901 for establishing data connections with a network 905, such as a local area network coupled to other broadcast system computers and servers.

The processors 701, 801, and 901 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 702, 802, and 902 before they are accessed and loaded into the processors 701, 801, and 901. The processors 701, 801, and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 701, 801, and 901 including internal memory or removable memory plugged into the various devices and memory within the processors 701, 801, and 901.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable instructions (or software instructions) which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of responding by a computing device to messages soliciting responses, comprising:
   receiving, by the computing device, an invitation message configured for receipt by a plurality of recipient computing devices, wherein the received invitation message includes information associated with a request that solicits a response;
   rendering and displaying, at the computing device, a first image based on the request that solicits a response;
   extracting, by the computing device, content information from the received invitation message;
   retrieving, by the computing device, validation information for validating the request based on the content information extracted from the received invitation message, wherein the validation information is retrieved from at least one of a time measurement unit, a source of location information, a local information database, or an Internet website;
   transmitting, from the computing device, a first response message based on the retrieved validation information;
   receiving, at the computing device, a cancellation message configured for receipt by the plurality of recipient computing devices; and
   rendering and displaying, at the computing device, a second image based on the cancellation message.

2. The method of claim 1, further comprising:
   transmitting, from the computer device, a second response message including information responding to the request that solicits a response,
   wherein the second response message includes one of a follow-up question to the request, a complete answer to the request, and a partial answer to the request.

3. The method of claim 1, wherein the retrieved validation information includes at least one of a time, coordinates of the computing device, and calendar data associated with a user of the computing device.

4. The method of claim 1, wherein rendering and displaying, at the computing device, the second image based on the cancellation message comprises performing one or more automatic operations that hide the display, delete the display, adjust the display to indicate the request is fulfilled, or adjust the display to indicate the request has a changed priority based on the cancellation message.

5. The method of claim 1, further comprising:
   determining, by the computing device, whether the request is valid based on the retrieved validation information; and
   rendering and displaying, by the computing device, a third image in response to determining that the request is not valid based on the retrieved validation information.

6. The method of claim 5, wherein the first response message includes information indicating that the request is not valid in response to determining that the request is not still valid.

7. The method of claim 1, wherein the content information is extracted from the received invitation message using natural language processing.

8. The method of claim 2, wherein the second response message includes a follow-up question to the request, the method further comprising:
  receiving, at the computing device, an updated invitation message, wherein the received updated invitation message includes information associated with an updated request; and
  rendering and displaying, at the computing device, a fourth image based on the updated request.

9. A computing device, comprising:
  a display;
  a memory; and
  a processor configured with processor-executable instructions to perform operations comprising:
    receiving an invitation message configured for receipt by a plurality of recipient computing devices, wherein the received invitation message includes information associated with a request that solicits a response;
    rendering and displaying, on the display, a first image based on the request that solicits a response;
    extracting content information from the received invitation message;
    retrieving validation information for validating the request based on the content information extracted from the received invitation message, wherein the validation information is retrieved from at least one of a time measurement unit, a source of location information, a local information database, or an Internet website;
    transmitting a first response message based on the retrieved validation information;
    receiving a cancellation message configured for receipt by the plurality of recipient computing devices; and
    rendering and displaying, on the display, a second image based on the cancellation message.

10. The computing device of claim 9, wherein the processor is configured with processor-executable instructions to perform operations further comprising:
  transmitting a second response message including information responding to the request that solicits a response,
  wherein the second response message includes one of a follow-up question to the request, a complete answer to the request, and a partial answer to the request.

11. The computing device of claim 9, wherein the retrieved validation information includes at least one of a time, coordinates of the computing device, and calendar data associated with a user of the computing device.

12. The computing device of claim 9, wherein the processor is configured with processor-executable instructions to perform operations such that rendering and displaying, at the computing device, the second image based on the cancellation message comprises performing one or more automatic operations that hide the display, delete the display, adjust the display to indicate the request is fulfilled, or adjust the display to indicate the request has a changed priority.

13. The computing device of claim 9, wherein the processor is configured with processor-executable instructions to perform operations further comprising:
  determining whether the request is valid based on the retrieved validation information; and
  rendering and displaying a third image in response to determining that the request is not valid based on the retrieved validation information.

14. The computing device of claim 13, wherein the first response message includes information indicating that the request is not valid in response to determining that the request is not still valid.

15. The computing device of claim 9, wherein the content information is extracted from the received invitation message using natural language processing.

16. The computing device of claim 10,
  wherein the second response message includes a follow-up question to the request, and
  wherein the processor is configured with processor-executable instructions to perform operations further comprising:
    receiving an updated invitation message, wherein the received updated invitation message includes information associated with an updated request; and
    rendering and displaying a fourth image based on the updated request.

17. A non-transitory processor-readable storage medium having stored thereon processor-executable instructions configured to cause a processor of a computing device to perform operations comprising:
  receiving an invitation message configured for receipt by a plurality of recipient computing devices, wherein the received invitation message includes information associated with a request that solicits a response;
  rendering and displaying a first image based on the request that solicits a response;
  extracting content information from the received invitation message;
  retrieving validation information for validating the request based on the content information extracted from the received invitation message, wherein the validation information is retrieved from at least one of a time measurement unit, a source of location information, a local information database, or an Internet website;
  transmitting a first response message based on the retrieved validation information;
  receiving a cancellation message configured for receipt by the plurality of recipient computing devices; and
  rendering and displaying a second image based on the cancellation message.

18. The non-transitory processor-readable storage medium of claim 17, wherein the retrieved validation information includes at least one of a time, coordinates of the computing device, and calendar data associated with a recipient user.

19. The non-transitory processor-readable storage medium of claim 17, wherein the stored processor-executable instructions are configured to cause the processor of the computing device to perform operations such that rendering and displaying, at the computing device, the second image based on the cancellation message comprises performing one or more automatic operations that hide the display, delete the display, adjust the display to indicate the request is fulfilled, or adjust the display to indicate the request has a changed priority.

20. The non-transitory processor-readable storage medium of claim 17, wherein the stored processor-executable instructions are configured to cause the processor of the computing device to perform operations further comprising:
  determining whether the request is valid based on the retrieved validation information; and
  rendering and displaying a third image in response to determining that the request is not valid based on the retrieved validation information.

21. The non-transitory processor-readable storage medium of claim 20, wherein the first response message includes information indicating the request is not valid in response to determining that the request is not still valid.

22. The non-transitory processor-readable storage medium of claim 17,
wherein the stored processor-executable instructions are configured to cause the processor of the computing device to perform operations further comprising:
transmitting a second response message including information responding to the request that solicits a response, wherein the second response message includes a follow-up question to the request,
receiving an updated invitation message, wherein the received updated invitation message includes information associated with an updated request, and
rendering and displaying a fourth image based on the updated request.

23. A computing device, comprising:
means for receiving an invitation message configured for receipt by a plurality of recipient computing devices, wherein the received invitation message includes information associated with a request that solicits a response;
means for rendering and displaying a first image based on the request that solicits a response;
means for extracting content information from the received invitation message;
means for retrieving validation information for validating the request based on the content information extracted from the received invitation message, wherein the validation information is retrieved from at least one of a time measurement unit, a source of location information, a local information database, or an Internet website;
means for transmitting a first response message based on the retrieved validation information;
means for receiving a cancellation message configured for receipt by the plurality of recipient computing devices; and
means for rendering and displaying a second image based on the cancellation message.

24. The computing device of claim 23, further comprising:
means for transmitting a second response message including information responding to the request that solicits a response,
wherein the second response message includes one of a follow-up question to the request, a complete answer to the request, and a partial answer to the request.

25. The computing device of claim 23, wherein the retrieved validation information includes at least one of a time, coordinates of the computing device, and calendar data associated with a user of the computing device.

26. The computing device of claim 23, wherein means for rendering and displaying a second image based on the cancellation message comprises means for performing one or more automatic operations that hide the display, delete the display, adjust the display to indicate the request is fulfilled, or adjust the display to indicate the request has a changed priority.

27. The computing device of claim 23, further comprising:
means for determining whether the request is valid based on the retrieved validation information; and
means for rendering and displaying a third image in response to determining that the request is not valid based on the retrieved validation information.

28. The computing device of claim 27, wherein the first response message includes information indicating that the request is not valid in response to determining that the request is not still valid.

29. The computing device of claim 23, wherein the content information is extracted from the received invitation message using natural language processing.

30. The computing device of claim 24,
wherein the second response message includes a follow-up question to the request, and
wherein the computing device further comprising:
means for receiving an updated invitation message, wherein the received updated invitation message includes information associated with an updated request; and
means for rendering and displaying a fourth image based on the updated request.

* * * * *